US008015393B2

(12) United States Patent
Fukasawa

(10) Patent No.: US 8,015,393 B2
(45) Date of Patent: Sep. 6, 2011

(54) DATA PROCESSING DEVICE, ENCRYPTION COMMUNICATION METHOD, KEY GENERATION METHOD, AND COMPUTER PROGRAM

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/101,493

(22) Filed: Apr. 8, 2005

(65) Prior Publication Data

US 2005/0228986 A1     Oct. 13, 2005

(30) Foreign Application Priority Data

Apr. 12, 2004 (JP) ................................. 2004-117117
Jun. 29, 2004 (JP) ................................. 2004-191542

(51) Int. Cl.
*G06F 9/00* (2006.01)
(52) U.S. Cl. ............ 713/1; 713/150; 713/156; 713/168; 713/189; 726/6; 380/44; 380/277
(58) Field of Classification Search .................. 713/156, 713/176, 189, 168, 1, 150; 380/44, 277; 726/6
See application file for complete search history.

(56) References Cited

U.S. PATENT DOCUMENTS

| | | | | |
|---|---|---|---|---|
| 5,144,665 A | * | 9/1992 | Takaragi et al. | 380/30 |
| 5,796,840 A | * | 8/1998 | Davis | 705/51 |
| 5,812,669 A | * | 9/1998 | Jenkins et al. | 713/161 |
| 5,883,956 A | * | 3/1999 | Le et al. | 713/170 |
| 6,233,577 B1 | * | 5/2001 | Ramasubramani et al. | 1/1 |
| 6,424,718 B1 | * | 7/2002 | Holloway | 380/277 |
| 6,442,688 B1 | * | 8/2002 | Moses et al. | 713/158 |
| 6,477,254 B1 | | 11/2002 | Miyazaki et al. | |
| 6,694,025 B1 | * | 2/2004 | Epstein et al. | 380/279 |
| 6,738,907 B1 | * | 5/2004 | Carter | 726/9 |
| 6,757,825 B1 | * | 6/2004 | MacKenzie et al. | 713/169 |
| 6,839,841 B1 | * | 1/2005 | Medvinsky et al. | 713/175 |
| 6,901,510 B1 | * | 5/2005 | Srivastava | 713/163 |
| 6,918,038 B1 | * | 7/2005 | Smith et al. | 726/22 |
| 6,978,025 B1 | * | 12/2005 | Price, III | 380/282 |
| 7,050,584 B1 | * | 5/2006 | Hoffmann et al. | 380/44 |
| 7,076,667 B1 | | 7/2006 | Gama | |
| 7,085,386 B2 | * | 8/2006 | Audebert et al. | 380/281 |
| 7,111,322 B2 | * | 9/2006 | Slick et al. | 726/5 |

(Continued)

FOREIGN PATENT DOCUMENTS

EP          1320009          6/2003

(Continued)

OTHER PUBLICATIONS

"Key Management for SCADA", C. L. Beaver et al, Sandia National Laboratories, pp. 1-31, 2002.*

(Continued)

*Primary Examiner* — Nasser Moazzami
*Assistant Examiner* — Shanto M Abedin
(74) *Attorney, Agent, or Firm* — Fitzpatrick, Cella, Harper & Scinto

(57) ABSTRACT

A data processing device comprises a storage unit adapted to store an initial value of a pair of a public key and a private key and a communication unit adapted to execute communication with an external device with use of the initial value of the pair of the public key and the private key stored in the storage unit, thereby enabling encryption communication without generating the pair of the public key and the private key.

5 Claims, 18 Drawing Sheets

U.S. PATENT DOCUMENTS

| | | | |
|---|---|---|---|
| 7,206,412 B2* | 4/2007 | Yokota et al. | 380/278 |
| 7,305,556 B2 | 12/2007 | Slick et al. | |
| 7,409,061 B2* | 8/2008 | Newcombe | 380/251 |
| 7,522,732 B2* | 4/2009 | Whitehead | 380/286 |
| 2002/0138725 A1* | 9/2002 | Moses et al. | 713/156 |
| 2002/0154782 A1* | 10/2002 | Chow et al. | 380/278 |
| 2002/0164035 A1* | 11/2002 | Yokota et al. | 380/278 |
| 2003/0105963 A1 | 6/2003 | Slick et al. | |
| 2003/0112346 A1* | 6/2003 | Owlett et al. | 348/231.6 |
| 2003/0196080 A1* | 10/2003 | Karman | 713/150 |
| 2003/0212892 A1* | 11/2003 | Oishi | 713/168 |
| 2004/0003263 A1* | 1/2004 | Brique et al. | 713/189 |
| 2004/0109567 A1* | 6/2004 | Yang et al. | 380/277 |
| 2004/0109568 A1* | 6/2004 | Slick et al. | 380/277 |
| 2005/0120203 A1* | 6/2005 | Yeh et al. | 713/156 |

FOREIGN PATENT DOCUMENTS

| | | | |
|---|---|---|---|
| JP | 09-205419 A | 8/1997 | |
| JP | 10-133956 | 5/1998 | |
| JP | 10-133956 A | 5/1998 | |
| JP | 10-240128 A | 9/1998 | |
| JP | 11-098133 | 4/1999 | |
| JP | 11-168460 | 6/1999 | |
| JP | 11-203128 | 7/1999 | |
| JP | 11-203128 A | 7/1999 | |
| JP | 11-317734 | 11/1999 | |
| JP | 11-317734 A | 11/1999 | |
| JP | 2001-022646 | 1/2001 | |
| JP | 2001-044988 | 2/2001 | |
| JP | 2001-044988 A | 2/2001 | |
| JP | 2001-111539 | 4/2001 | |
| JP | 2001-273111 | 10/2001 | |
| JP | 2003-169049 | 11/2001 | |
| JP | 2002-259108 | 9/2002 | |
| JP | 2002-374240 | 12/2002 | |
| JP | 2003-224561 | 8/2003 | |

OTHER PUBLICATIONS

Notification of Reasons for Refusal dated Apr. 7, 2010, issued in Japanese Patent Application No. 2004-191542.

Notification of Reason for Refusal, dated Oct. 4, 2010, issued by the Japanese Patent Office in Japanese Patent Application No. 2004-117117.

Notification of Reason for Refusal dated Jun. 22, 2010, issued by Japanese Patent Office in Japanese Patent Application No. 2004-117117 (partial translation).

* cited by examiner

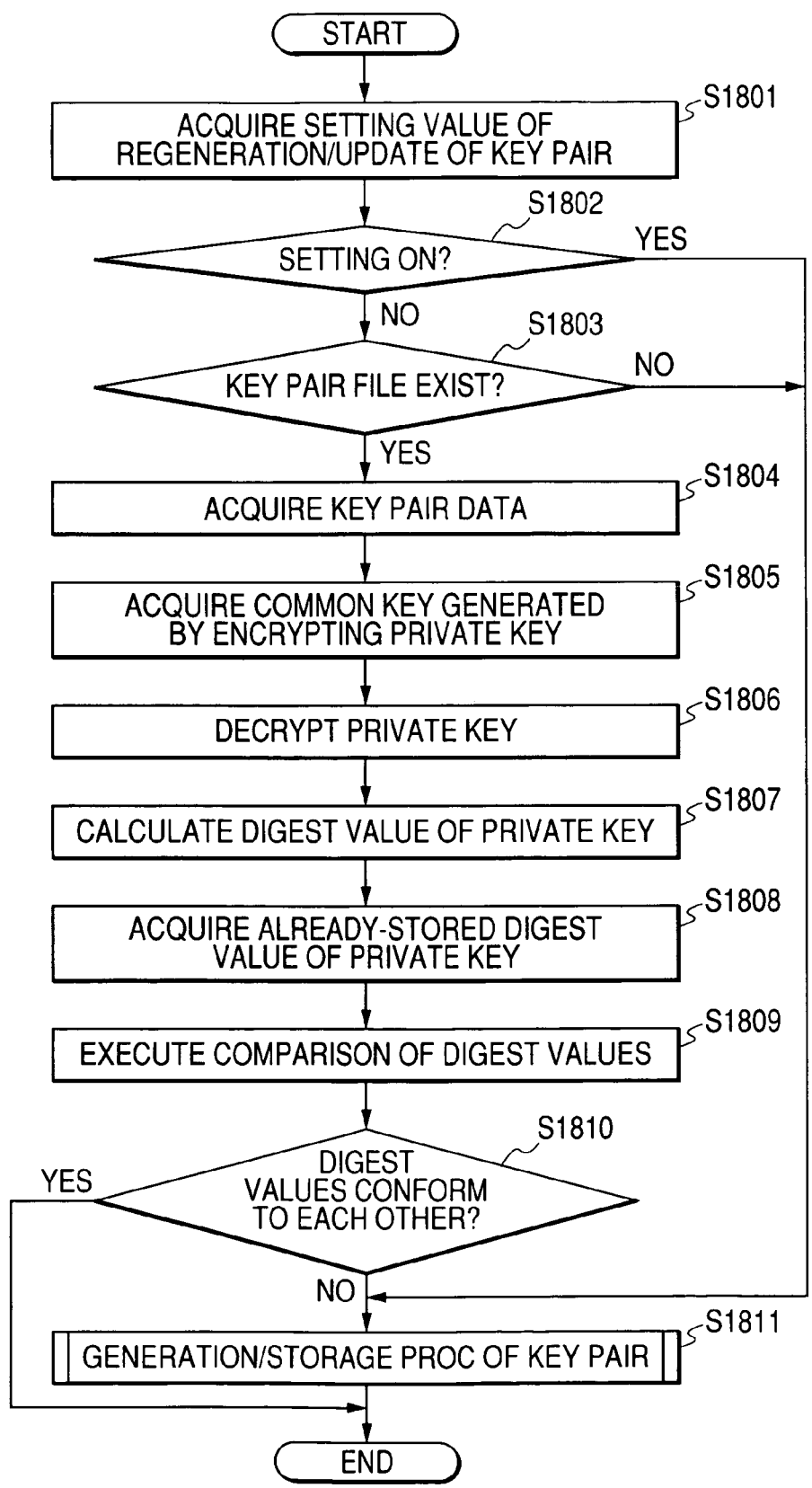

DATA PROCESSING DEVICE, ENCRYPTION COMMUNICATION METHOD, KEY GENERATION METHOD, AND COMPUTER PROGRAM

BACKGROUND OF THE INVENTION

1. Field of the Invention

The present invention relates to technique concerning a data processing device, an encryption communication method, a key generation method and computer program for executing these methods.

2. Related Background Art

Recently, a network security function has come to be requested to a data processing device. To comply with such a request, for example, the data processing device as disclosed in Japanese Patent Application Laid-Open No. 2002-259108 has and holds a public key certificate and a private key (here, a secret key which corresponds to a public key is called "a private key") corresponding thereto, and executes authentication based on the public key certificate in accordance with a request from a document server or a client computer.

Incidentally, it is assumed that a pair of an encryption public key (i.e., public key for encryption) and a decryption private key (i.e., private key for decryption) is created outside the data processing device, a certificate of the created pair is issued from a reliable organization, and the issued certificate is installed in the data processing device. Here, the pair of the encryption public key and the decryption private key is called "encryption key/private key pair" or "private key/encryption key pair" hereinafter. In such a circumstance, with respect to the data processing device which does not have an input unit such as an FD (floppy™ disk or flexible disk), a CD (compact disk) or the like, it is necessary to install through a network the private key/public key pair and the certificate from a terminal located on the relevant network to the data processing device.

Moreover, to safely install the private key/public key pair and the certificate thereof from the terminal to the data processing device through the network, it is desirable to execute cryptographic communication (or cipher communication) between the terminal and the data processing device. In this connection, a private key/public key pair is necessary to execute the cryptographic communication.

However, there is a possibility that the data processing device in a factory shipment status does not have own public key/private key pair. In such a case, the cryptographic communication for installing the private key/public key pair and the certificate thereof might not be able to be executed.

Moreover, for example, in an environment that takes not much interest in security or in an environment that does not necessarily need perfect security, all users do not necessarily indicate generation of the public key and the private key before executing the cryptographic communication.

For this reason, even if the user does not execute a complicated operation to generate the public key and the private key, it is desirable to appropriately prepare and provide the public key/private key pair.

Moreover, even after the public key/private key pair was once prepared, if the public key/private key pair is damaged, it is desirable to newly prepare and provide the public key/private key pair without any complicated operation by the user.

SUMMARY OF THE INVENTION

An object of the present invention is to provide a data processing device which is characterized in that, by comprising a storage unit adapted to store an initial value of a pair of a public key and a private key and a communication unit adapted to execute communication with an external device with use of the initial value of the pair of the public key and the private key stored in the storage unit, it enables encryption communication without generating the pair of the public key and the private key.

Moreover, another object of the present invention is to provide a data processing device which is characterized in that, by comprising a storage unit adapted to store an initial value of a public key certificate, and a communication unit adapted to execute communication with an external device by using the initial value of the public key certificate stored in the storage unit, it enables encryption communication without generating the public key certificate.

Furthermore, still another object of the present invention is to provide a data processing device which is characterized by comprising a judgment unit adapted to judge whether or not it is necessary to generate a pair of a public key and a private key for executing encryption communication with an external device, a key generation unit adapted to automatically generate the pair of the public key and the private key in a case where the judgment unit judges that it is necessary to generate the pair of the public key and the private key and a key storage unit adapted to store in a storage medium the pair of the public key and the private key generated by the key generation unit.

In addition, still another object of the present invention is to provide a data processing device which is characterized by comprising a judgment unit adapted to judge whether or not a pair of a public key and a private key stored in a storage medium is damaged, a key generation unit adapted to automatically generate the pair of the public key and the private key in a case where the judgment unit judges that the pair of the public key and the private key is damaged, and a key storage unit adapted to store in the storage medium the pair of the public key and the private key generated by the key generation unit.

BRIEF DESCRIPTION OF THE DRAWINGS

FIG. 18 is a flow chart for explaining one example of the operation to be executed by the print device in case of regenerating and updating a key pair according to user setting.

DETAILED DESCRIPTION OF THE PREFERRED EMBODIMENTS (Network Print System According To First Embodiment)

As substantially explained in the following, the present invention is premised on a network print system in which a terminal and an image forming device are connected on a network. In this system, the embodiment of the present invention enables to achieve both a method of easily installing a public key/private key pair and a public key certificate from the terminal to the image forming device for a user who does not demand high-level security and a method of safely installing the key pair and the certificate through the network without any leakage and alteration (or interpolation).

Figure 1:
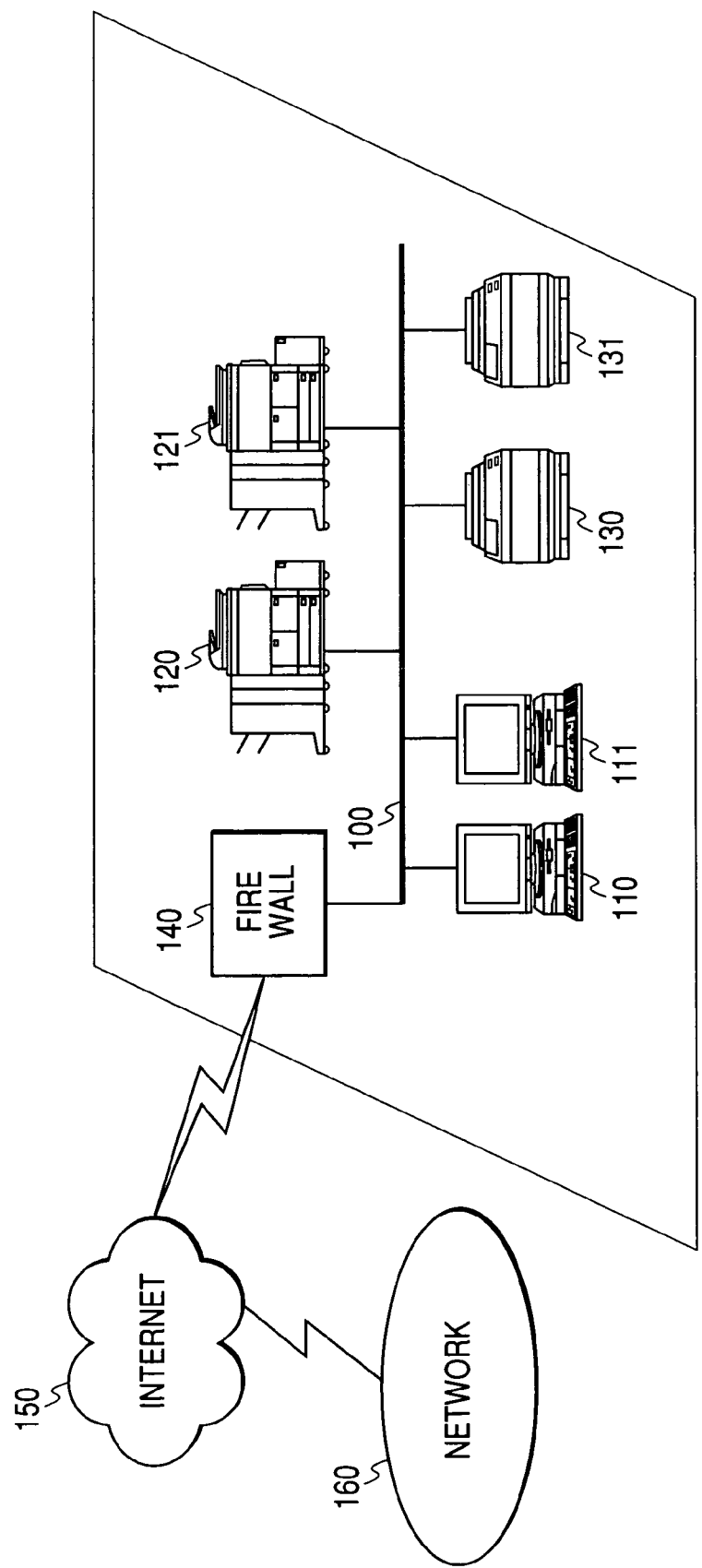
FIG. 1 is a diagram showing the configuration of a print system according to the first embodiment of the present invention.

FIG. 1 is a diagram showing the configuration by which the print system according to the first embodiment of the present invention can operate.

In FIG. 1, each of numerals 110 and 111 denotes a terminal (that is, a PC (personal computer)), each of numerals 120 and 121 denotes a multifunctional image forming device (hereinafter called an MFP (multifunctional peripheral)), and each of numerals 130 and 131 denotes a single functional image forming device (hereinafter called an SFP (single functional peripheral)). Here, all of the terminals 110 and 111, the MFP's 120 and 121, and the SFP's 130 and 131 are connected to a LAN (local area network) 100. Incidentally, it should be noted that, in the following explanation, the MFP's 120 and 121 and the SFP's 130 and 131 are generically called the image forming device.

Numeral 140 denotes a fire wall through which the LAN 100 is connected to the external Internet 150. Moreover, the LAN 100 is further connected to another network 160 through the fire wall 140 and the Internet 150.

Incidentally, for example, a user creates a print job at the terminal 110 and transfers the created print job to the MFP 120. Then, if an error which cannot be recovered does not still occur, the MFP 120 accepts the print job as storing a current processing situation, receives the data of the print job, and executes a print process to the received data. Here, the error which cannot be recovered includes, for example, an error for which turning off and on of a power supply are necessary to recover, an error for which a service person's operation is necessary to recover, and the like.

In a status such as paper jam, paper empty of the like that the current processing situation can be stored when recovering this status to a steady status, the data reception operation is executed as usual, and then the print process is executed after recovering this status to the steady status. In addition, even when the error which cannot be recovered occurs, if a process other than the print job is requested, the data of the requested process is received as usual, and the received data is then processed.

Figure 2:
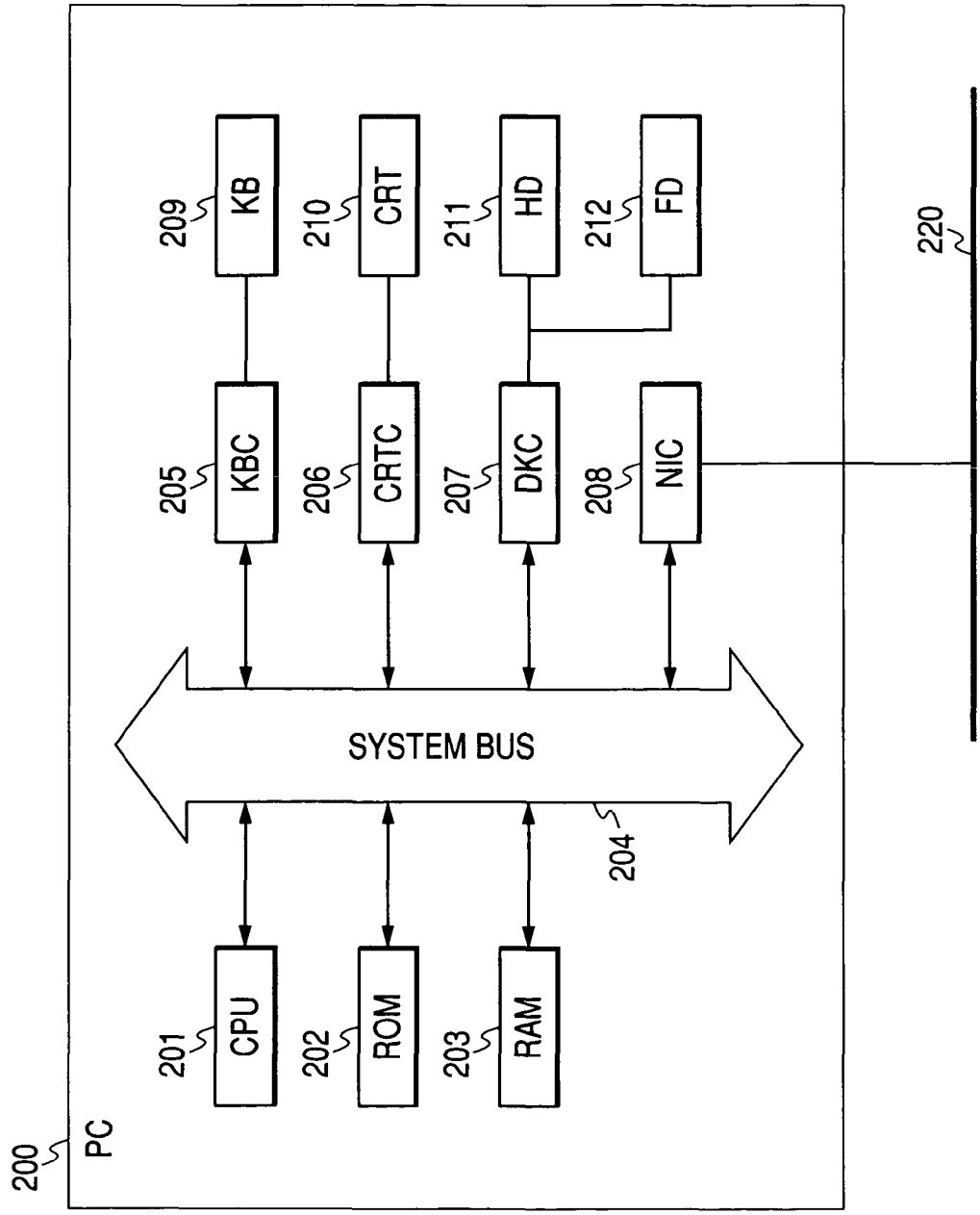
FIG. 2 is a block diagram showing the internal constitution of a commonly used personal computer.

FIG. 2 is a block diagram showing the internal constitution of a commonly used personal computer, and this internal constitution is equivalent to the internal constitution of each of the terminals 110 and 111. In FIG. 2, a PC (personal computer) 200 contains a CPU (central processing unit) 201 which executes various software stored in a ROM (read only memory) 202 or an HD (hard disk) 211 or supplied from an FD (floppy™ disk or flexible disk) 212, whereby the CPU 201 totally controls the devices connected to a system bus 204.

Numeral 203 denotes a RAM (random access memory) which functions as the main memory, the working area and the like for the CPU 201, numeral 205 denotes a KBC (keyboard controller) which controls instructions (or indications) transferred from a KB (keyboard) 209, a not shown pointing device and the like, and numeral 206 denotes a CRTC (cathode ray tube controller) which controls the displaying status of a CRT (or CRT display) 210.

Numeral 207 denotes a DKC (disk controller) which controls accessing to the HD 211 and the FD 212 which store a boot program, various applications, edited files, user files and the like. Numeral 208 denotes an NIC (network interface card) which bi-directionally exchanges data with a network printer, other network devices, and other PC's through a LAN 220. Here, it should be noted that, in the present embodiment, the LAN 220 is equivalent to the LAN 100 shown in FIG. 1.

Figure 3:
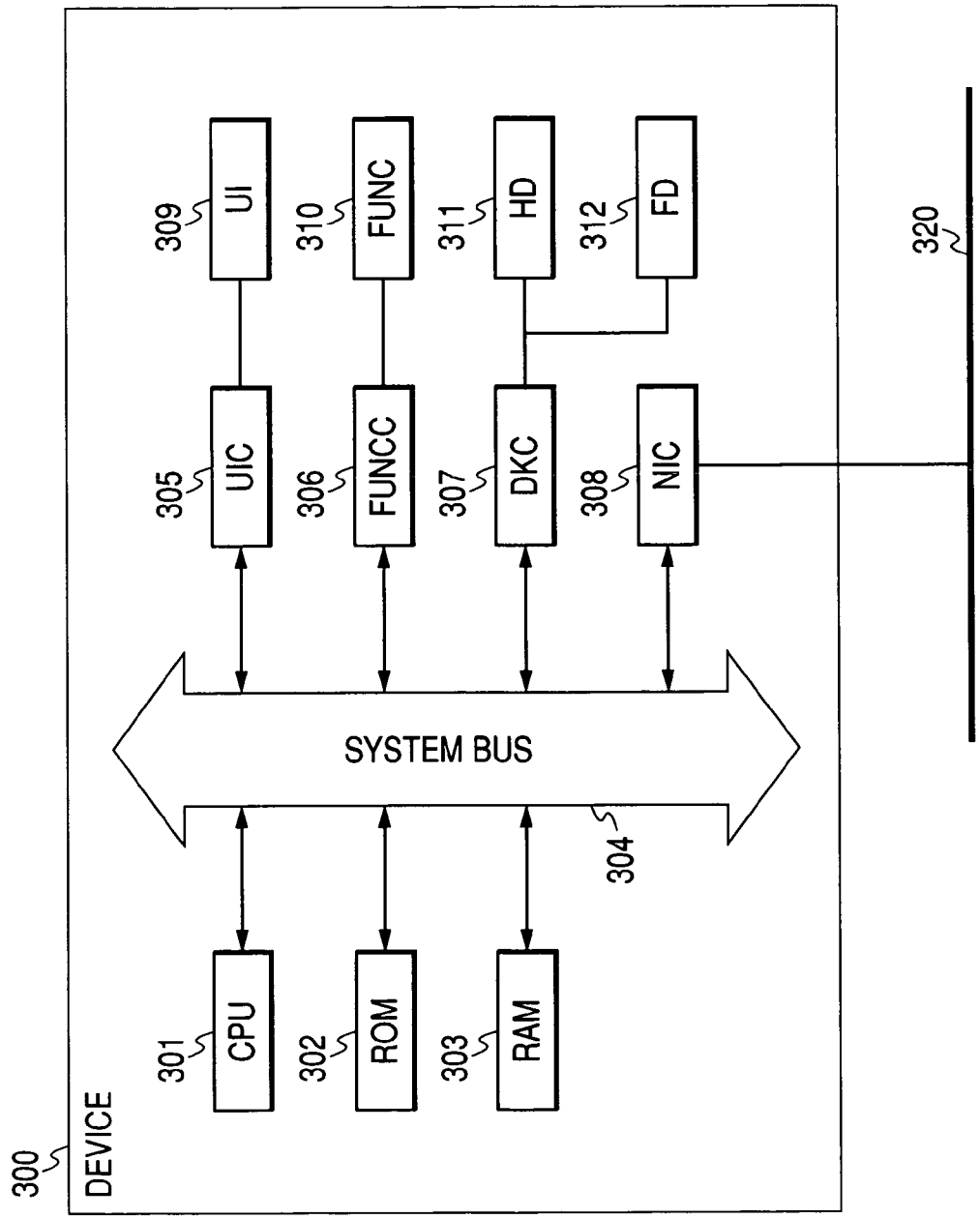
FIG. 3 is a block diagram showing the internal constitution of a commonly used image forming device.

In FIG. 3, a device 300 shows an example of the internal constitution of the MFP or the SFP on which the program according to the present embodiment operates, and this constitution is equivalent to the internal constitution of each of the MFP's 120 and 121 and the SFP's 130 and 131 shown in FIG. 1. Moreover, the device 300 contains a CPU 301 which executes various programs stored in a ROM 302 or an HD 311 or supplied from an FD 312, whereby the CPU 301 totally controls the devices connected to a system bus 304.

Numeral 303 denotes a RAM which functions as the main memory, the working area and the like for the CPU 301, and numeral 305 denotes a UIC (user interface controller) which controls display on a UI 309 and input of indications from the UI 309.

An FUNCC (function controller) 306 controls an FUNC (function) 310 which is the function peculiar to each device. Here, if the device 300 is a black-and-white printer, a black-and-white print engine controller corresponds to the FUNCC 306, and a black-and-white print engine corresponds to the FUNC 310. In the meantime, if the device 300 is a color printer, a color print engine controller corresponds to the FUNCC 306, and a color print engine corresponds to the FUNC 310. Furthermore, if the device is the MFP, the device 300 has the plural FUNCC's 306 and the plural FUNC's 310.

Numeral 307 denotes a DKC (disk controller) which controls accessing to the HD 311 and the FD 312 which store a boot program, programs for executing the operation according to the present embodiment, various applications, and data files. Numeral 308 denotes an NIC which bi-directionally exchanges data with a network printer, other network devices, and other PC's through a LAN 320. Here, it should be noted that, in the present embodiment, the LAN 320 is equivalent to the LAN 100 shown in FIG. 1.

Figure 4:
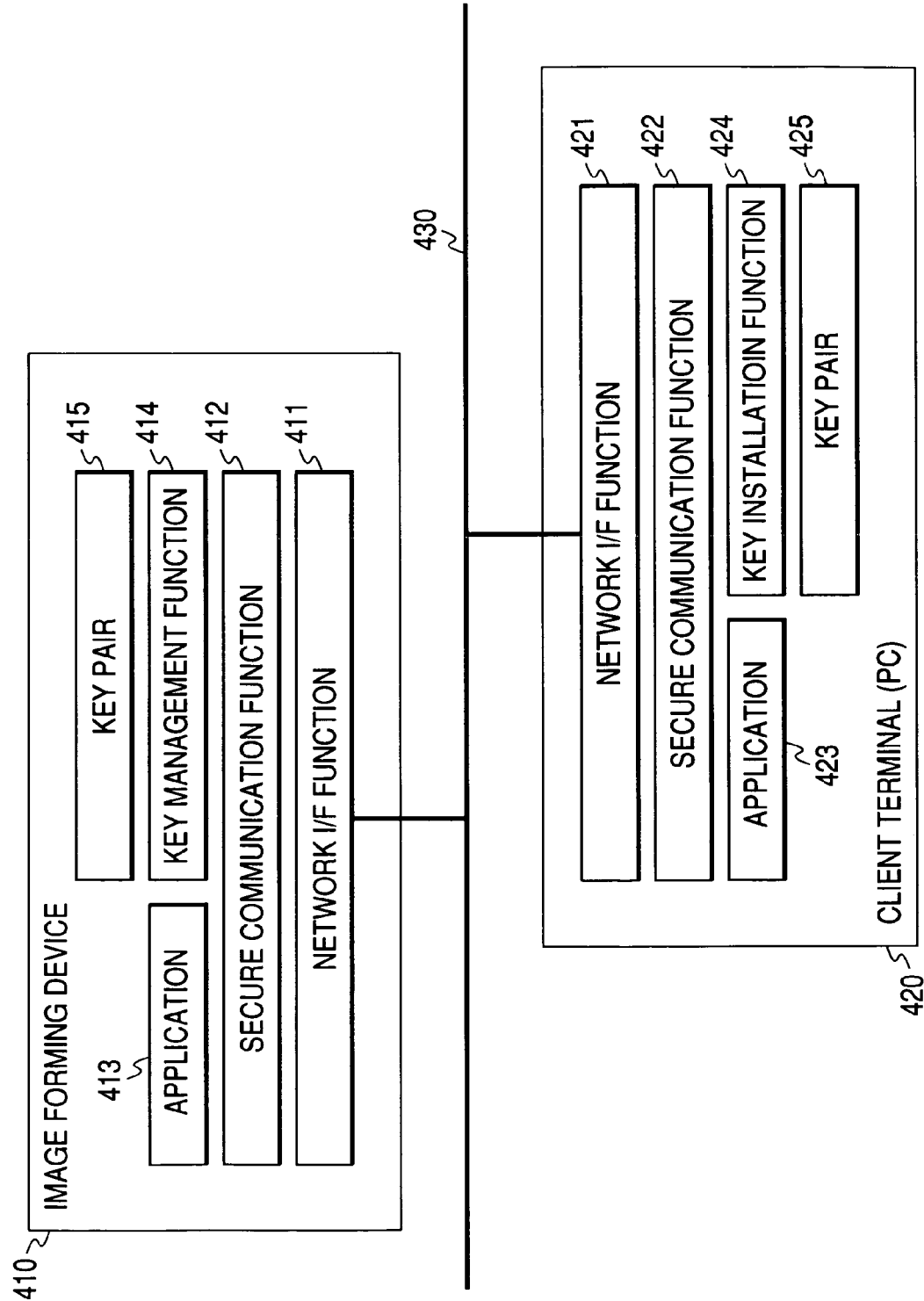
FIG. 4 is a diagram showing a model of a terminal and the image forming device.

FIG. 4 is a diagram showing a model of the print system according to the present embodiment. In FIG. 4, numeral 410 denotes an image forming device which is equivalent to each of the MFP's 120 and 121 and the SFP's 130 and 131 shown in FIG. 1, and numeral 420 denotes a client terminal (PC) which is equivalent to each of the terminals 110 and 111 shown in FIG. 1. Here, the image forming device 410 and the client terminal 420 are connected to each other through a LAN 430.

Numeral 411 denotes a network I/F (interface) function which is used to connect the image forming device 410 to the LAN 430, numeral 412 denotes a secure communication function which is used to execute data communication with security assured between the image forming device 410 and the client terminal 420 through the LAN 430, numeral 413 denotes an application which is supplied and provided in the image forming device 410, and numeral 414 denotes a key management function which is used to manage or administrate the key held in the image forming device 410. Here, it should be noted that the key management function 414 is a kind of application 413. Numeral 415 denotes a key pair, that is, a pair of a public key and a private key of an asymmetric key system.

Numeral 421 denotes a network I/F function which is used to connect the client terminal 420 to the LAN 430, numeral 422 denotes a secure communication function which is used to execute data communication with security assured between the client terminal 420 and the image forming device 410 through the LAN 430, numeral 423 denotes an application which is supplied and provided in the client terminal 420.

Numeral 424 denotes a key installation function which is used to install a key pair of the asymmetric key system in the image forming device. Here, it should be noted that the key installation function 424 is a kind of application 423. Numeral 425 denotes a key pair, that is, a pair of a public key and a private key of the asymmetric key system. The key pair 425 is installed in the image forming device 410 by the key installation function 424. Here, it should be noted that, in the present embodiment, the LAN 430 is equivalent to the LAN 100 shown in FIG. 1.

Figure 5:
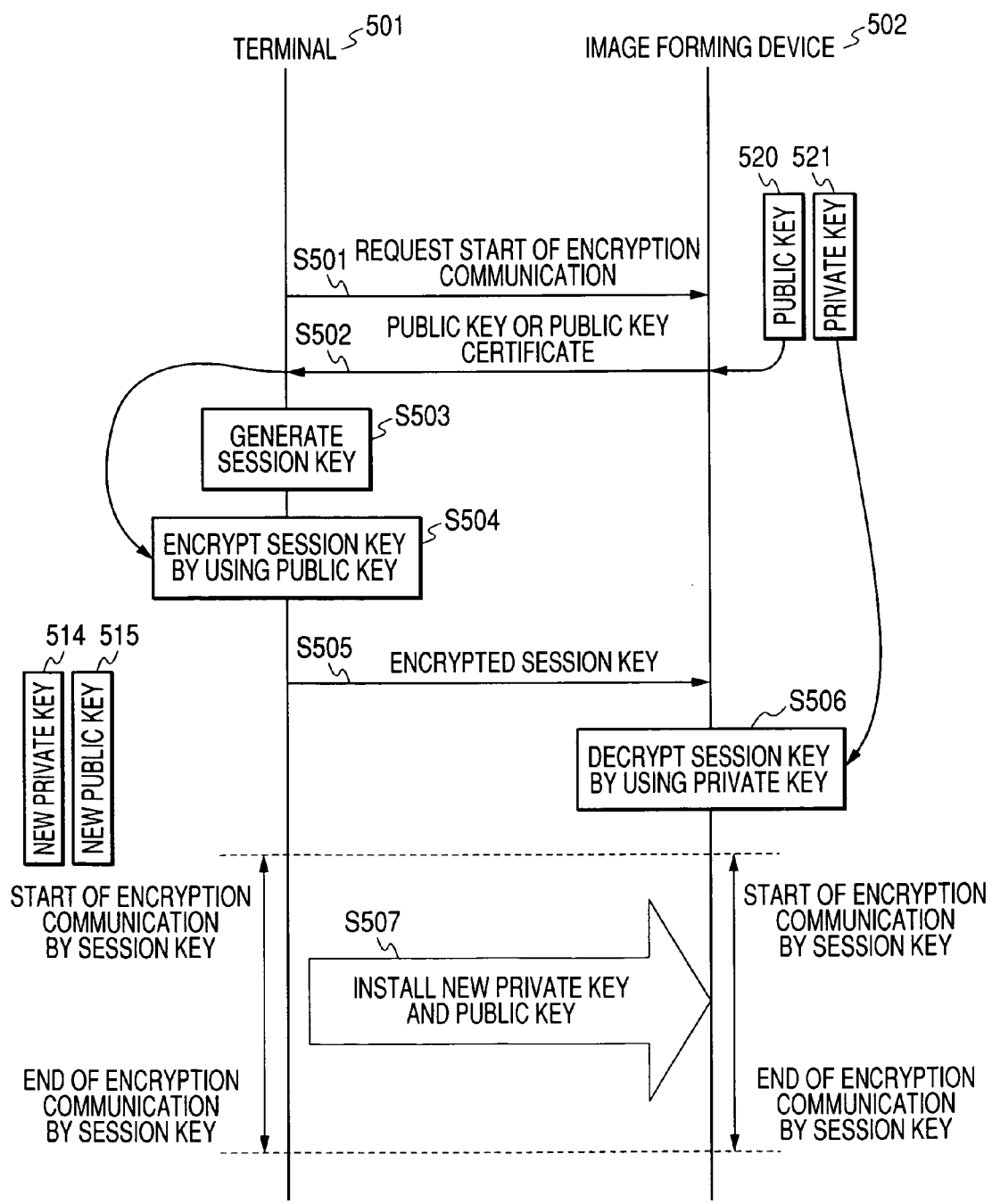
FIG. 5 is a diagram showing one example of the sequence to be executed between the terminal and the image forming device.

FIG. 5 is a diagram showing one example of the sequence to be executed between the terminal and the image forming device, according to the present embodiment. More specifically, FIG. 5 shows, on the premise that the public key and the private key have been already prepared, the sequence to be executed between the terminal and the image forming device when a new public key and a new private key are installed from the terminal to the image forming device. Here, how a public key 520 and a private key 521 are prepared will be later described with reference to FIGS. 6 to 8. In FIG. 5, numeral 501 denotes a terminal (PC) which is equivalent to the client terminal 420 of FIG. 4, and numeral 502 denotes an image forming device which is equivalent to the image forming device 410 of FIG. 4.

When installing the keys, in a step S501, a start of encryption communication is first requested from the terminal 501. When the request issued in the step S501 is acknowledged by the image forming device 502, in a step S502, the public key 520 or a public key certificate containing the public key 520 is transmitted from the image forming device 502 to the terminal 501.

Then, in the terminal 501 which received the public key 520 or the public key certificate containing the public key 520 in the step S502, a session key of a common key system to be used in the encryption communication for key installation is generated in a step S503, and the generated-session key is encrypted by using the public key in a step S504. After then, in a step S505, the session key encrypted in the step S504 is transmitted from the terminal 501 to the image forming device 502.

Subsequently, in the image forming device 502, the encrypted session key received in the step S505 is decrypted in a step S506. Thus, the image forming device 502 can secretly acquire the session key generated by the terminal 501 in the step S503. Here, numerals 514 and 515 respectively denote a new private key and a new public key which are both installed in the image forming device. Incidentally, the new private key 514 and the new public key 515 constitute together a new key pair which is equivalent to the key pair 425 of FIG. 4.

Then, the terminal 501 starts the encryption communication by using the session key, and, if necessary, the new key pair of the new private key 514 and the new public key 515 is transmitted to the image forming device 502 in a step S507. Thus, the image forming device 502 can secretly and safely acquire the new key pair of the new private key 514 and the new public key 515.

Figure 6:
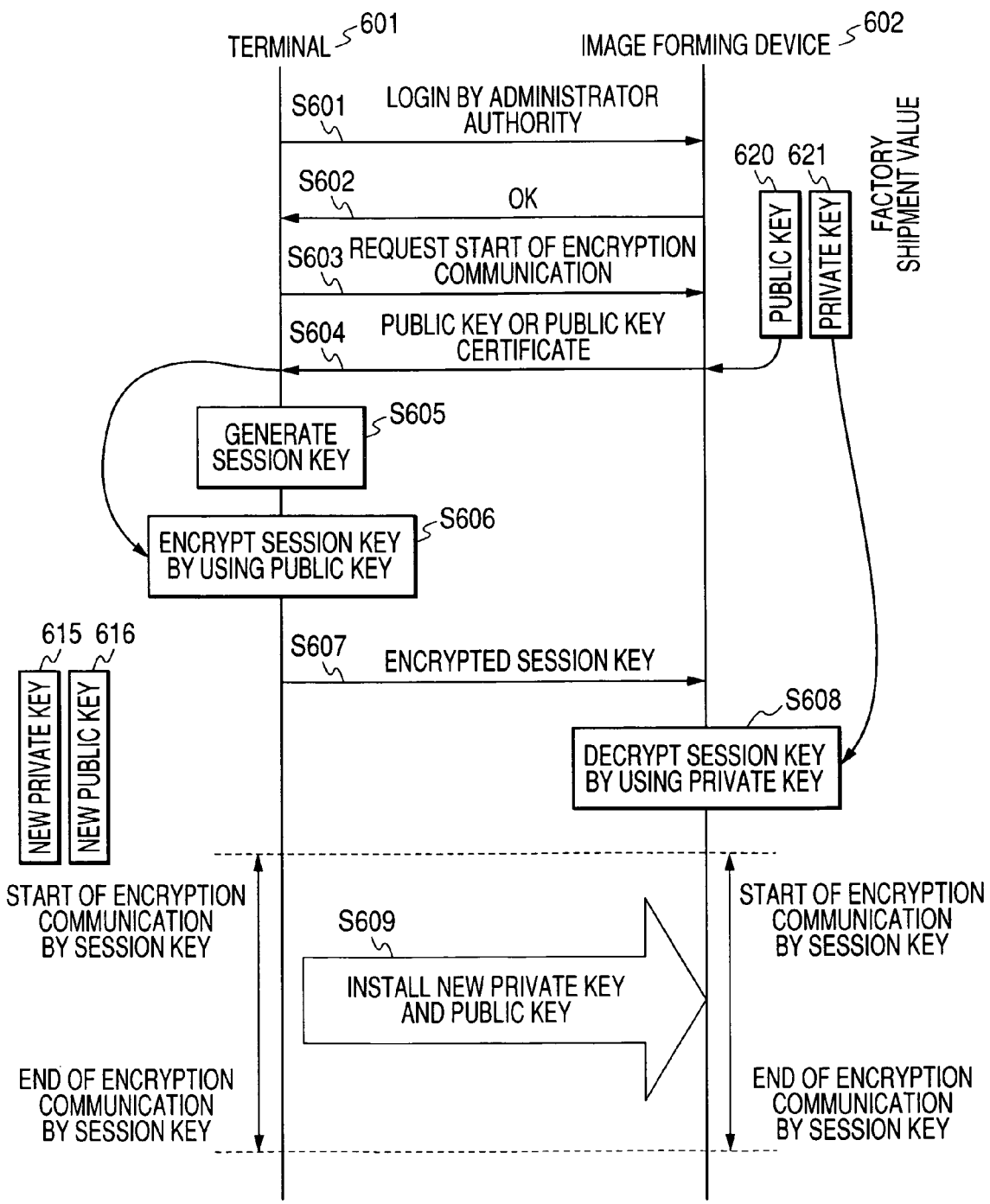
FIG. 6 is a diagram showing one example of the sequence to be executed between the terminal and the image forming device.

FIG. 6 is a diagram showing, as well as FIG. 5, one example of the sequence to be executed between the terminal and the image forming device, according to the present embodiment.

In FIG. 6, numeral 601 denotes a terminal (PC) which is equivalent to the client terminal 420 of FIG. 4, and numeral 602 denotes an image forming device which is equivalent to the image forming device 410 of FIG. 4. Here, this sequence is characterized in that the image forming device 602 is in a factory shipment status, a public key 620 and a private key 621 are provided as factory shipment values beforehand, and it is thus possible for the image forming device to start secure communication without newly generating the public key 620 and the private key 621.

First, in a step S601, a message is transmitted from the terminal 601 to the image forming device 602, so as to login by administrator authority. When the login by the administrator authority is acknowledged by the image forming device 602, a message "OK" is returned from the image forming device 602 to the terminal 601 in a step S602. After the login succeeded, in a step S603, a start of encryption transmission is requested from the terminal 601 to the image forming device 602.

Then, in a step S604, the public key 620 or a public key certificate containing the public key 620 is transmitted from the image forming device 602 to the terminal 601 as a response to the request of the start of encryption transmission. In the terminal 601 which received the public key 620 or the public key certificate containing the public key 620, a session key is generated in a step S605. Moreover, in a step S606, the generated session key is encrypted by using the public key acquired in the step S604.

Subsequently, in a step S607, the encrypted session key is transmitted from the terminal 601 to the image forming device 602, and, in a step S608, the transmitted session key is decrypted by the image forming device 602. Consequently, the image forming device 602 can secretly acquire the session key.

After the session key was transmitted, the terminal 601 starts the encryption communication by using the session key, and, if necessary, a new key pair of a private key 615 and a public key 616 is transmitted from the terminal 601 to the image forming device 602 in a step S609. Thus, the image forming device 602 receives the new pair of the new private key 615 and the new public key 616 in the step S609, whereby the image forming device 602 can secretly and safely acquire the new private key 615 and the new public key 616.

In this sequence, since the pair of the public key 620 and the private key 621 to be used in the steps S606 and S608 is the factory shipment value, there is a fear that the session key to be transmitted in the step S607 leaks to people outside. Nevertheless, a user can execute the encryption communication without executing complicated and time-consuming security setting, although the level of security in the communication is low.

As above, since the default value of the pair of the public key and the private key (also called the public key/private key pair) or the public key certificate thereof to be used to execute the encryption communication is stored in the storage device, it is possible to execute the encryption communication without executing complicated setting such as the generation of the public key/private key pair or the public key certificate. As the result of this, it is possible to execute the secure communication, which can achieve certain level of secret leakage prevention, without executing the complicated setting. Moreover, since the public key/private key pair can be installed from the terminal through the encryption communication using the default public key/private key pair and the default public key certificate, it is possible to eliminate the danger that the private key leaks to people outside when the key is exchanged.

Figure 7:
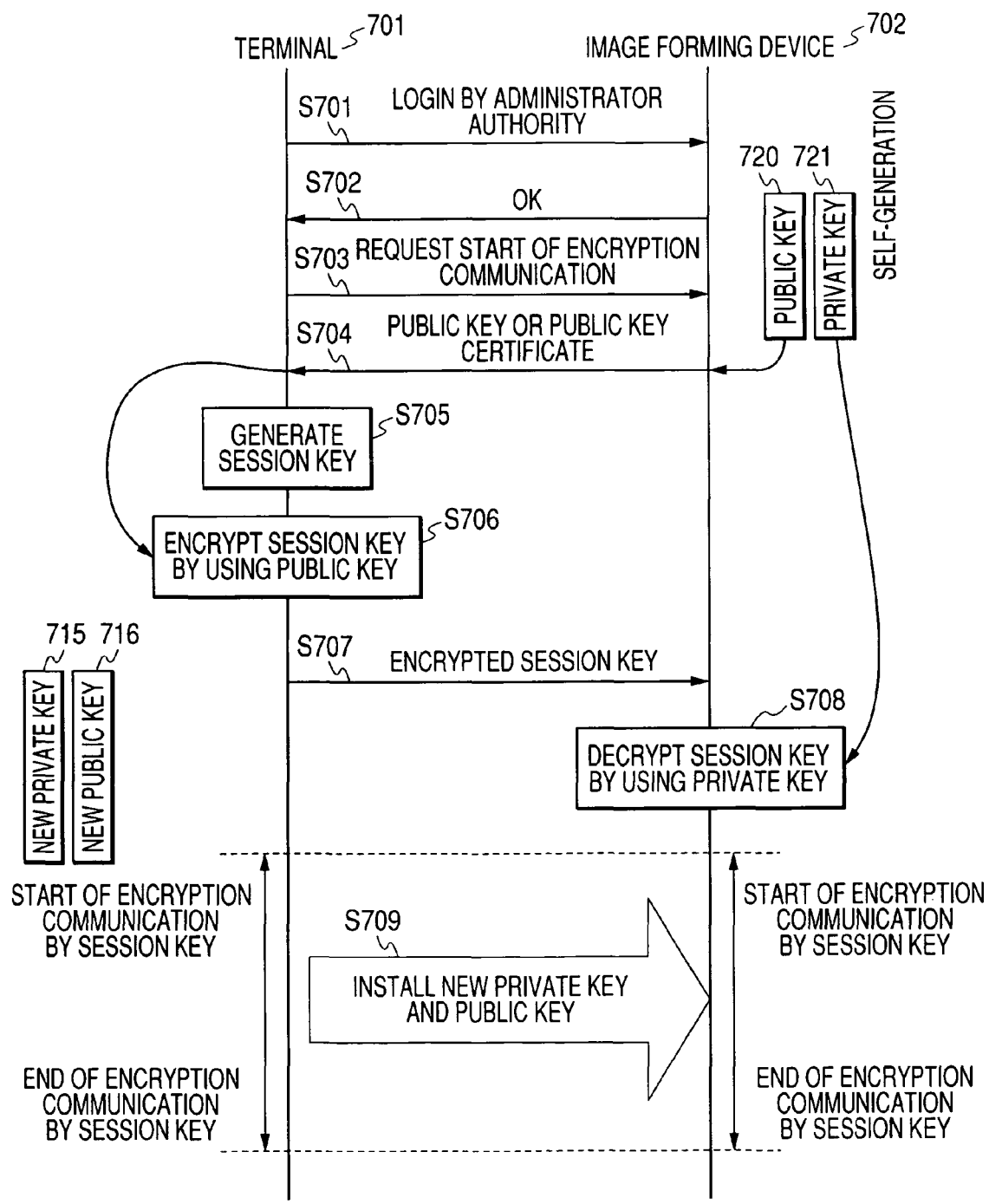
FIG. 7 is a diagram showing one example of the sequence to be executed between the terminal and the image forming device.

FIG. 7 is a diagram showing, as well as FIG. 5, one example of the sequence to be executed between the forming device and the PC, according to the present embodiment. In FIG. 7, numeral 701 denotes a terminal (PC) which is equivalent to the client terminal 420 of FIG. 4, and numeral 702 denotes an image forming device which is equivalent to the image forming device 410 of FIG. 4. Here, this sequence is characterized in that the image forming device has a pair of a public key 720 and a private key 721 both generated by the image forming device itself and thus called self-generated keys, and, therefore, there is no possibility that the session key leaks to people outside when the session key is exchanged. Incidentally, it is believed that the image forming device self-generates the pair of the public key 720 and the private key 721 according to an instruction (or an indication) input through an operation panel attached to the device or according to an instruction (or an indication) sent from the terminal.

First, in a step S701, a message is transmitted from the terminal 701 to the image forming device 702, so as to login by administrator authority. When the login by the administrator authority is acknowledged by the image forming device 702, a message "OK" is returned from the image forming device 702 to the terminal 701 in a step S702. After the login succeeded, in a step S703, a start of encryption transmission is requested from the terminal 701 to the image forming device 702.

Then, in a step S704, the public key 720 or a public key certificate containing the public key 720 is transmitted from the image forming device 702 to the terminal 701 as a response to the request of the start of encryption transmission.

After the public key 720 or the public key certificate containing the public key 720 was received, a session key is generated by the terminal 701 in a step S705. Moreover, in a step S706, the generated session key is encrypted by using the public key acquired in the step S704.

Subsequently, in a step S707, the encrypted session key is transmitted from the terminal 701 to the image forming device 702, and, in a step S708, the transmitted session key is decrypted by the image forming device 702. Consequently, the image forming device 702 can secretly acquire the session key. After the session key was transmitted, the terminal 701 starts the encryption communication by using the session key, and, if necessary, a new key pair of a private key 715 and a public key 716 is transmitted from the terminal 701 to the image forming device 702 in a step S709. Thus, the image forming device 702 receives the new pair of the new private key 715 and the new public key 716 as a message on the encryption communication, whereby the image forming device 702 can secretly and safely acquire the new private key 715 and the new public key 716.

In this sequence, since the pair of the public key 720 and the private key 721 to be used in the steps S706 and S708 is self-generated, there is no possibility that the session key transmitted in the step S707 leaks to the people outside.

For this reason, this sequence is quite safe against leakage and alteration in the encryption communication. Here, the public key or the public key certificate transmitted in the step S704 is the self-generated thing which is not certified by a reliable CA (certificate authority) or the like. However, if the public key or the public key certificate newly installed is the thing which is certified by the reliable CA, security improves moreover.

Figure 8:
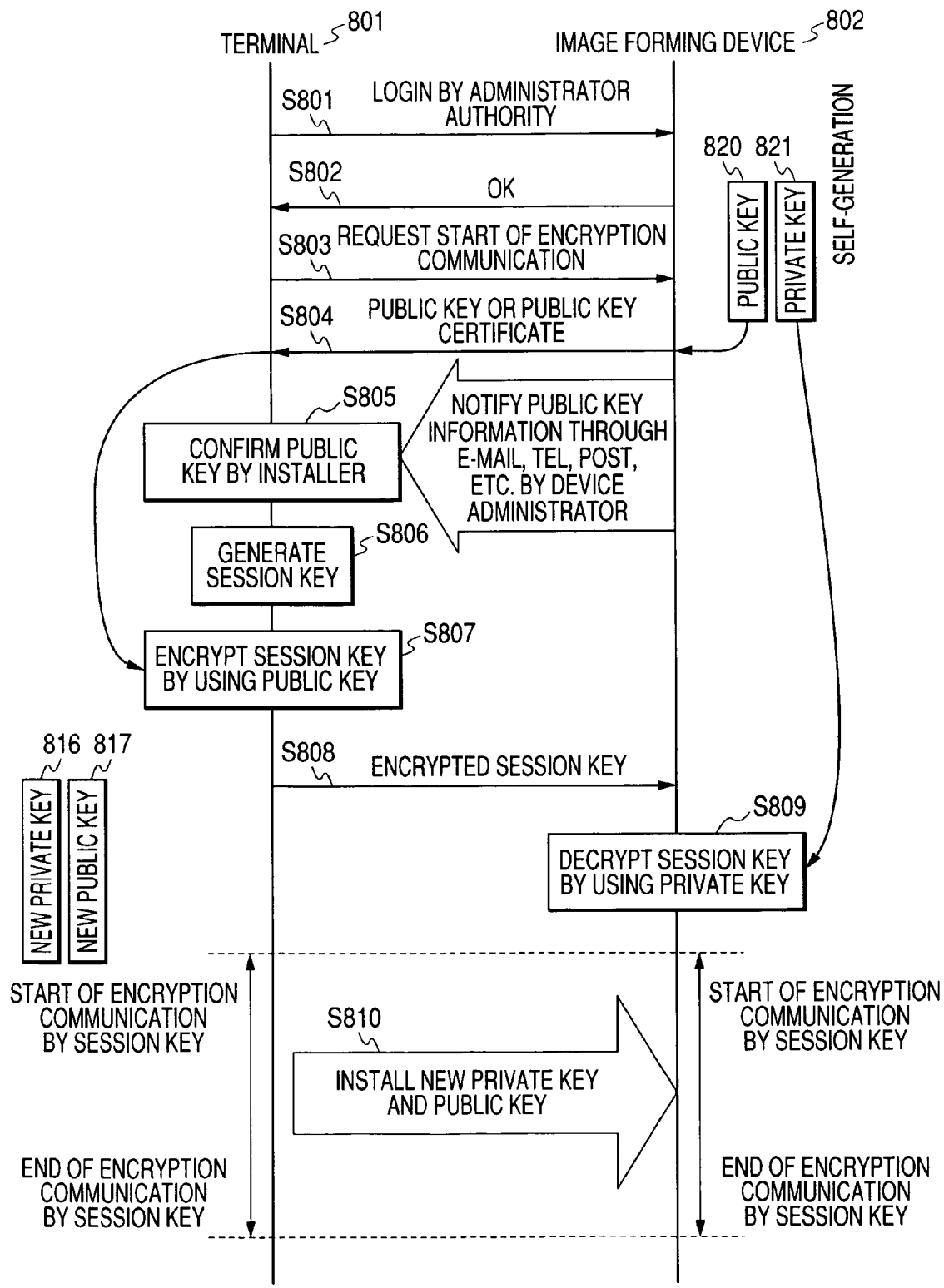
FIG. 8 is a diagram showing one example of the sequence to be executed between the terminal and the image forming device.

FIG. 8 is a diagram showing, as well as FIG. 5, one example of the sequence to be executed between the forming device and the terminal, according to the present embodiment. In FIG. 8, numeral 801 denotes a terminal (PC) which is equivalent to the client terminal 420 of FIG. 4, and numeral 802 denotes an image forming device which is equivalent to the image forming device 410 of FIG. 4. Here, this sequence is characterized in that the image forming device has a pair of a public key 820 and a private key 821 both generated by the image forming device itself and thus called self-generated keys, and, therefore, there is no possibility that the session key leaks to people outside when the session key is exchanged.

First, in a step S801, a message is transmitted from the terminal 801 to the image forming device 802, so as to login by administrator authority. When the login by the administrator authority is acknowledged by the image forming device 802, a message "OK" is returned from the image forming device 802 to the terminal 801 in a step S802. After the login succeeded, in a step S803, a start of encryption transmission is requested from the terminal 801 to the image forming device 802.

Then, in a step S804, the public key 820 or a public key certificate containing the public key 820 is transmitted from the image forming device 802 to the terminal 801 as a response to the request of the start of encryption transmission. Subsequently, in a step S805, the user (or installer) of the terminal 801 confirms the public key received and acquired from the image forming device 802 in the step S804.

Incidentally, the user of the terminal 801 visually confirms the value of the public key displayed on the UI screen of the image forming device 802. Besides, if the image forming device is located away from the user, a administrator of the device confirms the public key through its UI and then notifies the user of the terminal 801 of the confirmed public key through post, mail, telephone, publication on newspapers, publication on magazines, and the like.

After then, a session key is generated by the terminal 801 in a step S806. Moreover, in a step S807, the generated session key is encrypted by using the public key acquired in the step S802. Subsequently, in a step S808, the encrypted session key is transmitted from the terminal 801 to the image forming device 802.

In a step S809, the transmitted session key is decrypted by the image forming device 802. Consequently, the image forming device 802 can secretly acquire the session key. After the session key was transmitted, the terminal 801 starts the encryption communication by using the session key, and, if necessary, a new key pair of a private key 816 and a public key 817 is transmitted from the terminal 801 to the image forming device 802 in a step S810.

Thus, the image forming device 802 receives the new pair of the private key 816 and the public key 817 as a message on the encryption communication, whereby the image forming device 802 can secretly and safely acquire the new private key 816 and the new public key 817.

In this sequence, since the pair of the public key 820 and the private key 821 to be used in the steps S807 and S809 is self-generated, there is no possibility that the session key transmitted in the step S808 leaks to the people outside.

For this reason, this sequence is quite safe against leakage and alteration in the encryption communication. Here, the public key or the public key certificate transmitted in the step S804 is the self-generated thing. However, since the user of the terminal 801 confirms in the step S805 that the transmitted public key is the thing owned by the image forming device 802, this sequence is quite safe also against a dummy of the image forming device 802.

Figure 9:
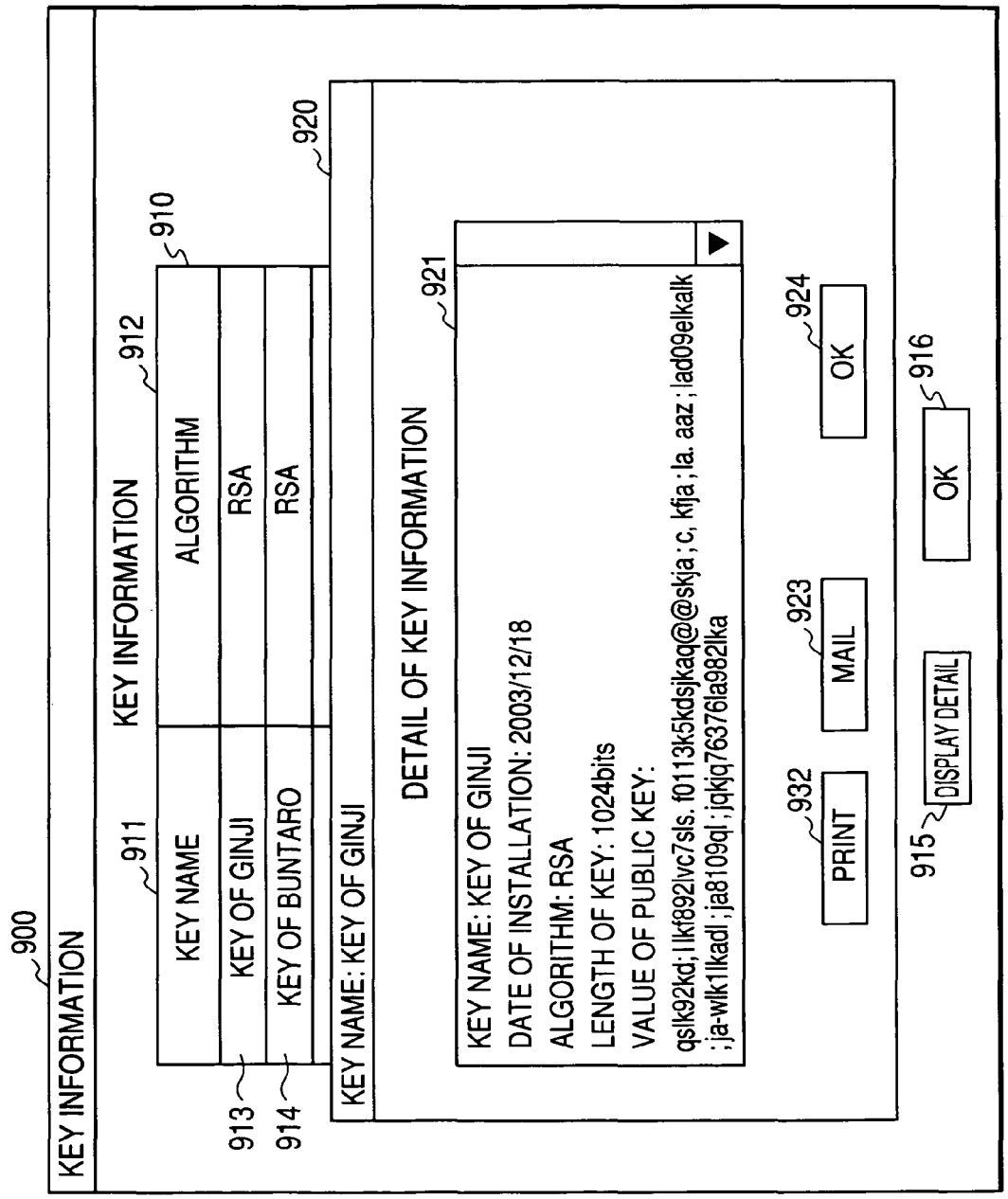
FIG. 9 is a diagram showing one example of a UI (user interface) screen of the image forming device.

FIG. 9 is a diagram showing one example of a UI screen 900 on which the administrator of the device confirms the public key information as shown in FIG. 8. In FIG. 9, a pane 910 displays, as a list, the keys held by the image forming device 802, a column 911 shows key names, and a column 912 shows algorithms used by the respective keys.

A row 913 shows that the key name is "KEY OF GINJI" and the used algorithm is RSA (Rivest Shamir Adleman), and a row 914 shows that the key name is "KEY OF BUNTARO" and the used algorithm is RSA. A button 915 is used to indicate display of the detailed information of the key selected in the pane 910, and a button 916 is used to indicate the operation to close the screen of the key information.

In the example of FIG. 9, the row 913 is selected, and the details of the key information corresponding to the row 913 are displayed in a pane 920. Here, numeral 921 denotes a location where the detailed information of the selected key is displayed. In the example of FIG. 9, it is displayed that the key name is "KEY OF GINJI", the date of installation is Dec. 18, 2003, the used algorithm is RSA, and the key length is 1024 bits. In addition, the value of the public key is also displayed.

A button 932 is used to indicate to print the details of the key information, a button 923 is used to send an E-mail concerning the details of the key information displayed in the display location 921, and a button 924 is used to indicate to close the pane 920. Here, it should be noted that the content of FIG. 9 is absolutely one example. Therefore, for example, the information of the public key certificate may be added to the pane 920.

(Network Print System According To Second Embodiment)

Subsequently, the network print system according to the second embodiment of the present invention will be explained with reference to the attached drawings.

Figure 11:
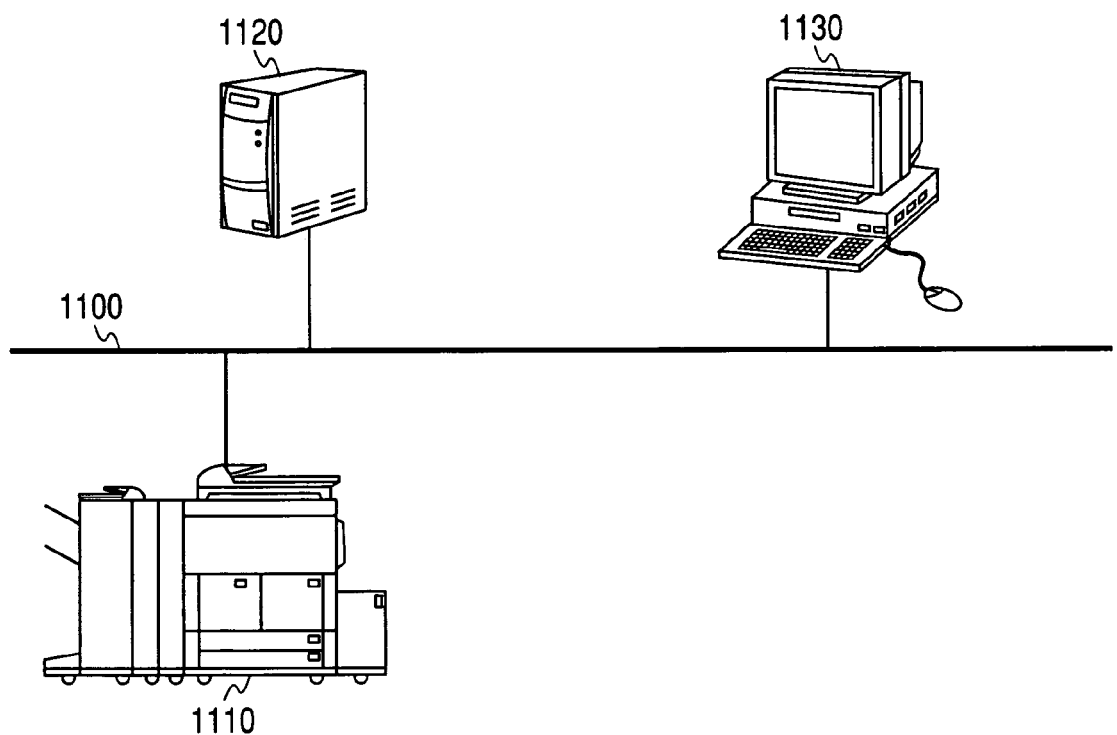
FIG. 11 is a diagram showing one example of the configuration of a network print system (or print communication system) according to the second embodiment of the present invention.

FIG. 11 is a diagram showing one example of the configuration of the network print system according to the second embodiment.

A print device 1110 according to the present embodiment is connected to an external controller terminal device 1120 of the print device 1110 and a user terminal device 1130 through a network 1100, whereby the print device 1110 can mutually execute data communication with the external controller terminal device 1120 and the user terminal device 1130. Here, it should be noted that FIG. 11 shows the single print device, the single external controller terminal device and the single user terminal device. However, it is possible to provide the plural print devices, the plural external controller terminal devices and the plural user terminal devices.

The print device 1110 in the present embodiment is the MFP (multifunctional peripheral) which can be used as a copying device and can also be used as a network printer.

The external controller terminal device 1120 of the print device 1110 enables to remotely control the print device 1110 by transmitting and receiving the control command or the control data of the print device 1110 through the network 1100.

The user terminal device 1130 is the device which enables a user to use various functions such as a print function and the like held in the print device 1110. For example, the user terminal device 1130 has a print application and/or a print driver which can be used with respect to the print device 1110, whereby the user terminal device 1130 transmits the print data to the print device 1110 or the external controller terminal device 1120 by using the print application and/or the print driver. Then, the print device 1110 executes printing based on the transmitted print data.

The external controller terminal device 1120 in the present embodiment is the terminal device in which the platform for a general-purpose personal computer (PC) is used, whereby the hardware constitution of the external controller terminal device 1120 is the same as that of the user terminal device 1130.

Incidentally, all the devices shown in FIG. 11 (the print device 1110, the external controller terminal device 1120 and the user terminal device 1130) are the network-corresponding devices capable of executing communication through the network 1100. Moreover, in the present embodiment, a LAN is used as the network 1100. However, it is needless to say that the network 1100 is not limited to the LAN, that is, a WAN (wide area network), the Internet and the like can also be used as the network 1100.

Besides, the communication between the print device 1110 and the external controller terminal device 1120 and the communication between the print device 1110 and the user terminal device 1130 can be achieved according to a given encryption communication protocol. Here, it should be noted that the encryption communication protocol is the protocol for certificating the device being a communication partner by using a key pair generated by a later-described key pair generation function of the print device 1110, and for generating a common key to be used in communication data encryption and then actually encrypting communication data.

Figure 12:
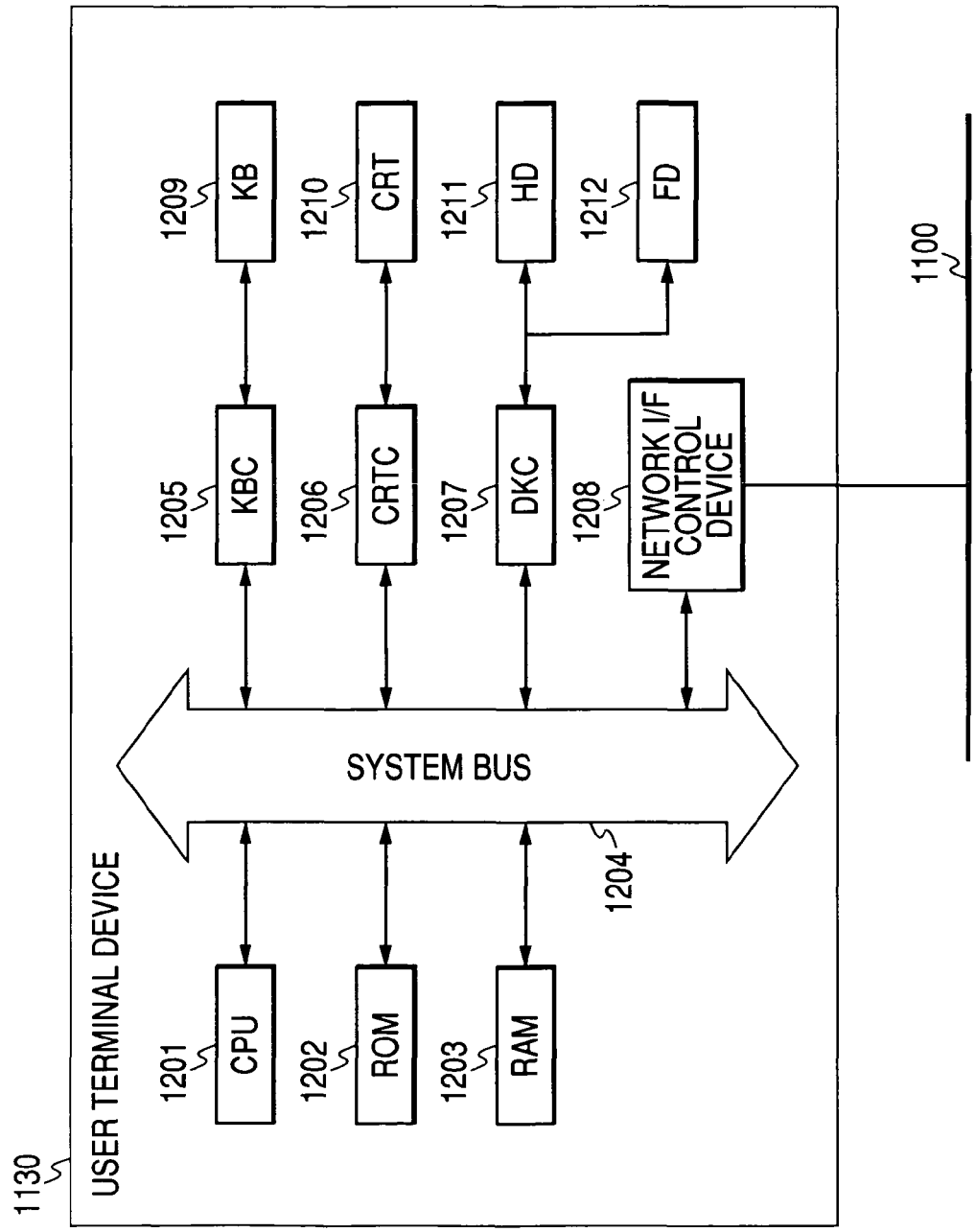
FIG. 12 is a block diagram showing one example of the internal constitution (i.e., hardware constitution) of a user terminal device.

FIG. 12 is a block diagram showing one example of the internal constitution (i.e., hardware constitution) of the user terminal device 1130.

In FIG. 12, a CPU 1201 executes control software stored in a ROM 1202 or an HD 1211 or supplied from an FD 1212, whereby the CPU 1201 totally controls the devices connected to a system bus 1204.

Here, it should be noted that, in the present embodiment, the encryption communication between the user terminal device 1130 and the print device 1110 is executed by the CPU 1201 based on the program stored in the ROM 1202 or the HD 1211.

Numeral 1203 denotes a RAM which functions as the main memory, the working area and the like for the CPU 1201, and numeral 1205 denotes a KBC (keyboard controller) which controls instructions (or indications) transferred from a KB (keyboard) 1209, a not shown pointing device and the like.

Numeral 1206 denotes a CRTC (cathode ray-tube controller) which controls the displaying status of a CRT (or CRT display) 1210, and numeral 1207 denotes a DKC (disk controller) which controls accessing to the HD 1211 and the FD 1212.

Here, the HD 1211 stores a boot program (that is, a starting program which is used to start executing (or operating) various hardware and software), plural applications, edited files, user files, a network management program and the like.

Numeral 1208 denotes a network I/F control device which bi-directionally exchanges data with the print device 1110, other network devices, and other PC's through the network (LAN) 1100.

Here, it should be noted that, in the present embodiment, the internal constitution (hardware constitution) of the external controller terminal device 1120 is the same as that of the user terminal device 1130 shown in FIG. 12, whereby the detailed explanation thereof will be omitted.

Figure 13:
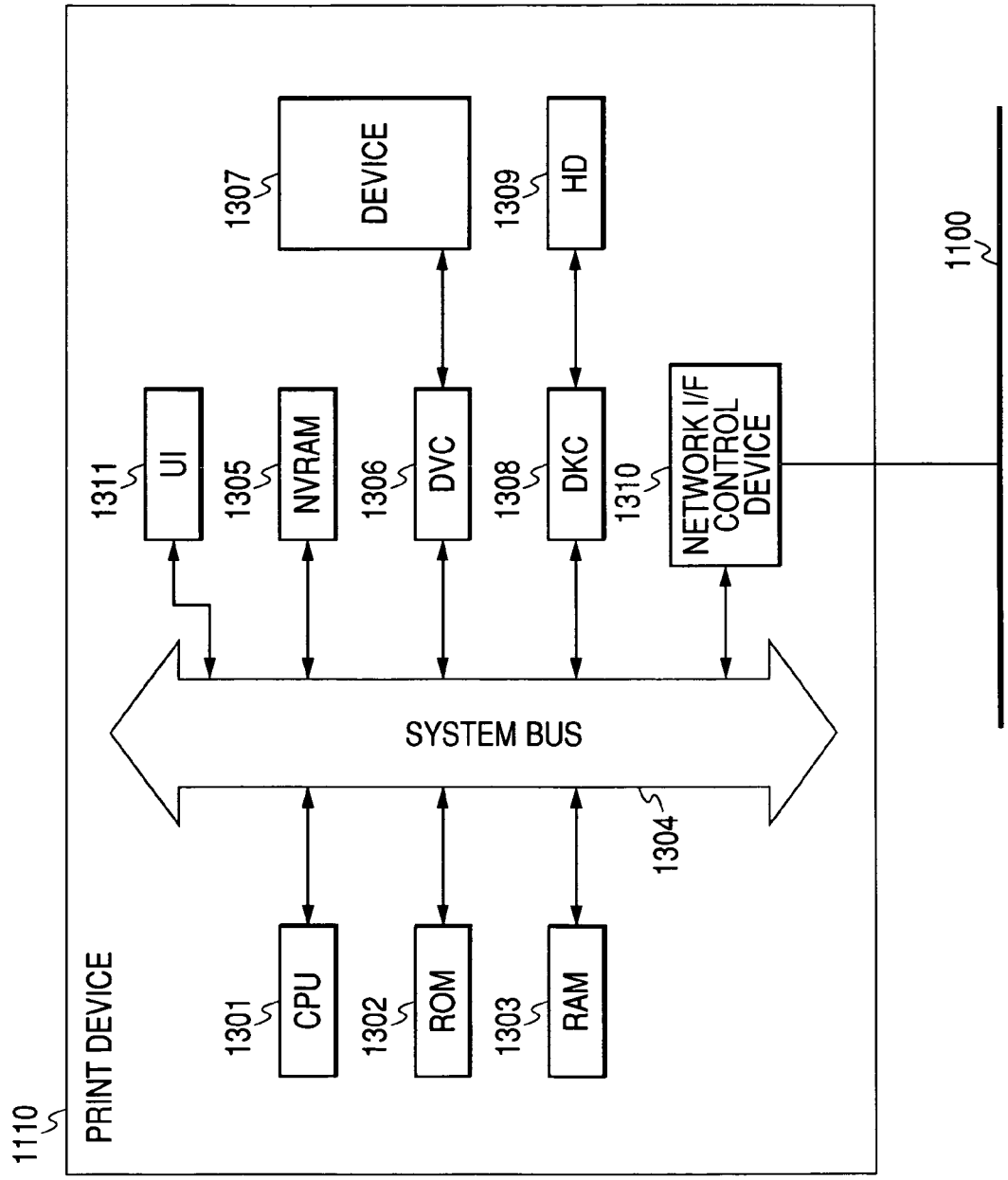
FIG. 13 is a block diagram showing one example of the internal constitution (i.e., hardware constitution) of a print device.

FIG. 13 is a block diagram showing one example of the internal constitution (i.e., hardware constitution) of the print device 1110. In FIG. 13, it should be noted that the print device 1110 is the network device on which the program of each unit according to the present embodiment runs.

The print device 1110 contains a CPU 1301. The CPU 1301 executes the program stored in a ROM 1302 or an HD 1309 so as to totally control the devices connected to a system bus 1304.

A RAM 1303 functions as the main memory, the working area and the like for the CPU 1301, an NVRAM (nonvolatile RAM) 1305 stores various setting values of the print device 1110, and a DVC (device controller) 1306 controls a device 1307.

Moreover, a DKC (disk controller) 1308 controls accessing to the HD 1309 which stores therein the programs for controlling the device and various data.

A network I/F control device 1310 bi-directionally exchanges data with a network printer, other network devices and other PC's through the network (LAN) 1100.

Incidentally, a UI (user interface) 1311 in the present embodiment has a display screen of a touch panel type. Therefore, a user can execute various setting operations for the print device 1110 by handling or operating the touch-panel display screen.

Figure 14:
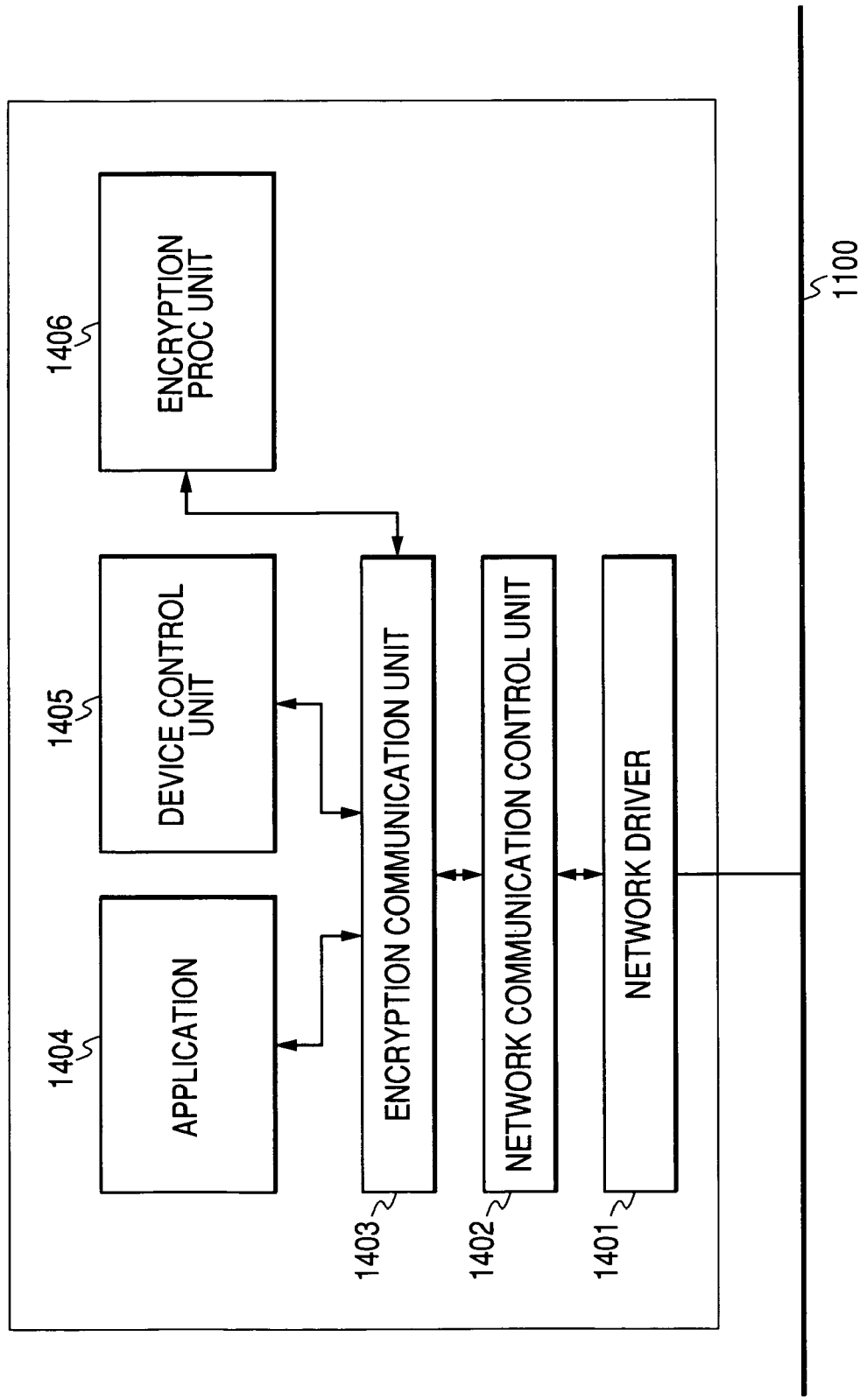
FIG. 14 is a block diagram showing one example of the software constitutions of an external controller terminal device and the user terminal device.

FIG. 14 is a block diagram showing one example of the software constitutions of the external controller terminal device 1120 and the user terminal device 1130 according to the present embodiment.

In FIG. 14, a network driver 1401 which is connected to the network 1100 controls the network I/F control device 1208 shown in FIG. 12 to transmit/receive the data to/from the external through the network 1100.

A network communication control unit 1402 controls a network communication protocol such as TCP/IP (Transmission Control Protocol/Internet Protocol) or the like to transmit/receive the data to/from the external.

Moreover, an encryption communication unit 1403 is the module for executing encryption communication according to the above-described given encryption communication protocol. Here, it should be noted that the encryption communication is the communication that data is transmitted/received in the encrypted form. Then, an encryption processing unit 1406 executes various encryption processes such as a process of encrypting the communication data to be transmitted, a process of decrypting the received communication data, and the like.

An application 1404 includes the various applications which use and/or execute the functions of the print device 1110 such as the print function and the like.

A device control unit 1405 is the module which is held by the external controller terminal device 1120. The device control unit 1405 executes a process for remotely controlling the print device 1110 by generating a control command and control data for the print device 1110 and then transmitting the generated control command and the control data to the print device 1110 through the network 1100.

Figure 15:
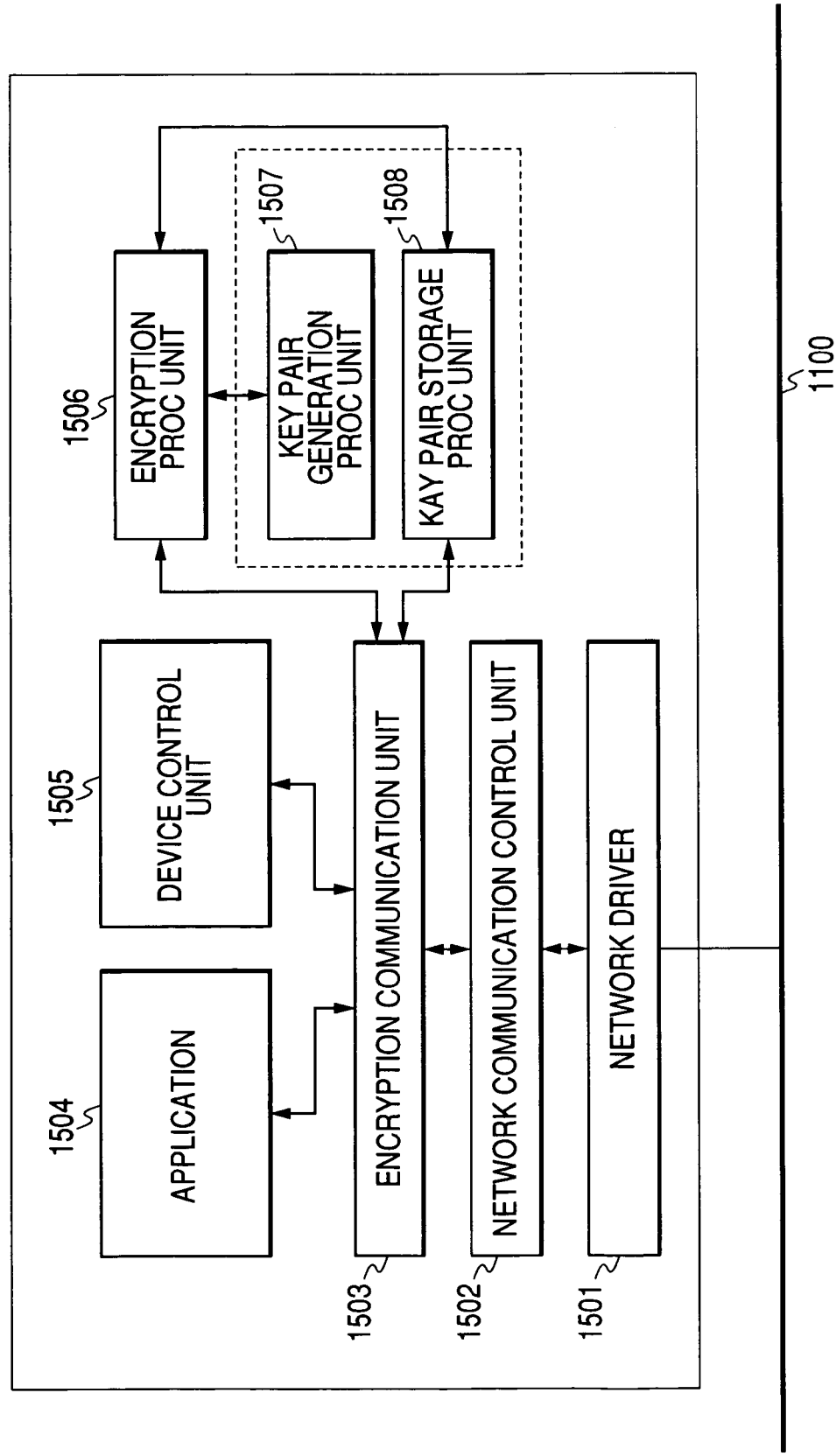
FIG. 15 is a block diagram showing one example of the software constitution of the print device.

FIG. 15 is a block diagram showing one example of the software constitution of the print device 1110 in the present embodiment.

In FIG. 15, a network driver 1501 which is connected to the network 1100 controls the network I/F control device 1310 shown in FIG. 13 to transmit/receive the data to/from the external through the network 1100.

A network communication control unit 1502 controls a network communication protocol such as TCP/IP or the like to transmit/receive the data to/from the external.

An encryption communication unit 1503 is the module for executing encryption communication according to the above-described given encryption communication protocol, and an encryption processing unit 1506 executes various encryption processes such as a process of encrypting the communication data to be transmitted, a process of decrypting the received communication data, and the like.

An application 1504 is the application which executes the functions of the print device 1110 such as the print function and the like.

A device control unit 1505 is the module which totally controls the print device 1110 by generating a control command and control data for the print device 1110.

A key pair generation processing unit 1507 is the module for executing a process of automatically generating data of the key pair (hereinafter called key pair data).

A key pair storage processing unit 1508 is the module for storing the key pair data generated through the process of the key pair generation processing unit 1507 in the HD 1309 or the NVRAM 1305 shown in FIG. 13. Besides, in response to a request from another module, the key pair storage processing unit 1508 reads the key pair data from the HD 1309 or the NVRAM 1305 and sends the read key pair data to the relevant module.

Subsequently, one example of the operation to be executed by the print device in case of automatically generating and storing the key pair data will be explained hereinafter with reference to a flow chart shown in FIG. 16.

In the following explanation, it is assumed that the key pair data of the print device 1110 is previously stored as a file in the HD 1309 of FIG. 13, and the file in which the key pair data is previously stored is called the key pair file.

Initially, in a step S1601, when the power supply of the print device 1110 is turned on, the encryption processing unit 1506 access the HD 1309 to judge whether or not the key pair file in which the key pair data is previously stored exists in the HD 1309.

When it is judged in the step S1601 that the key pair file exists in the HD 1309, the flow advances to a step S1602.

In the step S1602, the encryption processing unit 1506 opens the key pair file in the HD 1309 and acquires the data of the open key and the data of the private key both included in the key pair data.

In the present embodiment, it should be noted that the private key included in the key pair held by the print device 1110 is stored in the key pair file in the form encrypted by a common key encryption system.

Moreover, the data of the common key to be used to encrypt the private key is stored in the NVRAM 1305 of the print device 1110.

Incidentally, in the present embodiment, the data of the common key is stored in the NVRAM 1305 shown in FIG. 13 so that it is impossible to access the data of the common key from outside. Besides, in the present embodiment, only the private key is encrypted by the common key encryption system. However, it is needless to say that both the private key and the public key may be encrypted and stored in the file, and that the private key and the public key may be encrypted by a public key encryption system.

Subsequently, in a step S1603, the encryption processing unit 1506 accesses the NVRAM 1305 to acquire the data of the common key used in case of encrypting the private key. Then, in a step S1604, the encryption processing unit 1506 decrypts the data of the private key acquired in the step S1602 by using the acquired common key.

When the decryption of the private key in the step S1604 succeeds, the flow advances to a step S1605. In the step S1605, the key pair generation processing unit 1507 calculates and generates the digest value of the private key according to an algorithm of one-way hash function.

Here, it should be noted that SHA-1 (Secure Hash Algorithm-1), MD5 (Message Digest Algorithm 5) or the like can be used as the algorithm of one-way hash function.

In the present embodiment, even in case of generating the key pair data, the digest value of the private key is generated, and the generated digest value of the private key is stored in the NVRAM 1305 as well as the common key to be used in case of encrypting the private key.

Subsequently, in a step S1606, the key pair generation processing unit 1507 acquires from the NVRAM 1305 the digest value of the private key calculated when the key is generated.

Next, in a step S1607, the key pair generation processing unit 1507 compares the digest value acquired in the step S1606 with the digest value of the private key calculated in the step S1605, thereby detecting whether or not the held data of the private key is damaged.

Then, in a step S1608, the key pair generation processing unit 1507 judges whether or not the digest value acquired in the step S1606 conforms to the digest value of the private key calculated in the step S1605. Thus, when judged that the digest value acquired in the step S1606 does not conform to the digest value of the private key calculated in the step S1605, the flow advances to a next step S1609 to execute a later-described generation/storage process of the key pair (hereinafter called key pair generation/storage process). After then, when the key pair generation/storage process ends, the process ends as a whole. Meanwhile, when judged that the digest value acquired in the step S1606 conforms to the digest value of the private key calculated in the step S1605, the process immediately ends without executing the key pair generation/storage process.

Incidentally, when judged in the step S1601 that the key pair file does not exist in the HD 1309, the flow skips the steps S1602 to S1608 and directly advances to the step S1609 to execute the key pair generation/storage process.

In the present embodiment, the number of key pairs held by the print device 1110 is one. However, it is possible through the process of the above flow chart shown in FIG. 16 to automatically generate and store plural key pairs respectively according to necessary purposes. For example, it is possible to generate and store the key pairs respectively with respect to the users who use the print device 1110, and it is also possible to generate and store the key pairs respectively with respect to the applications on the print device 1110.

Subsequently, one example of the operation to be executed by the print device 1110 in case of executing the key pair generation/storage process will be explained hereinafter with reference to a flow chart shown in FIG. 17.

Figure 16:
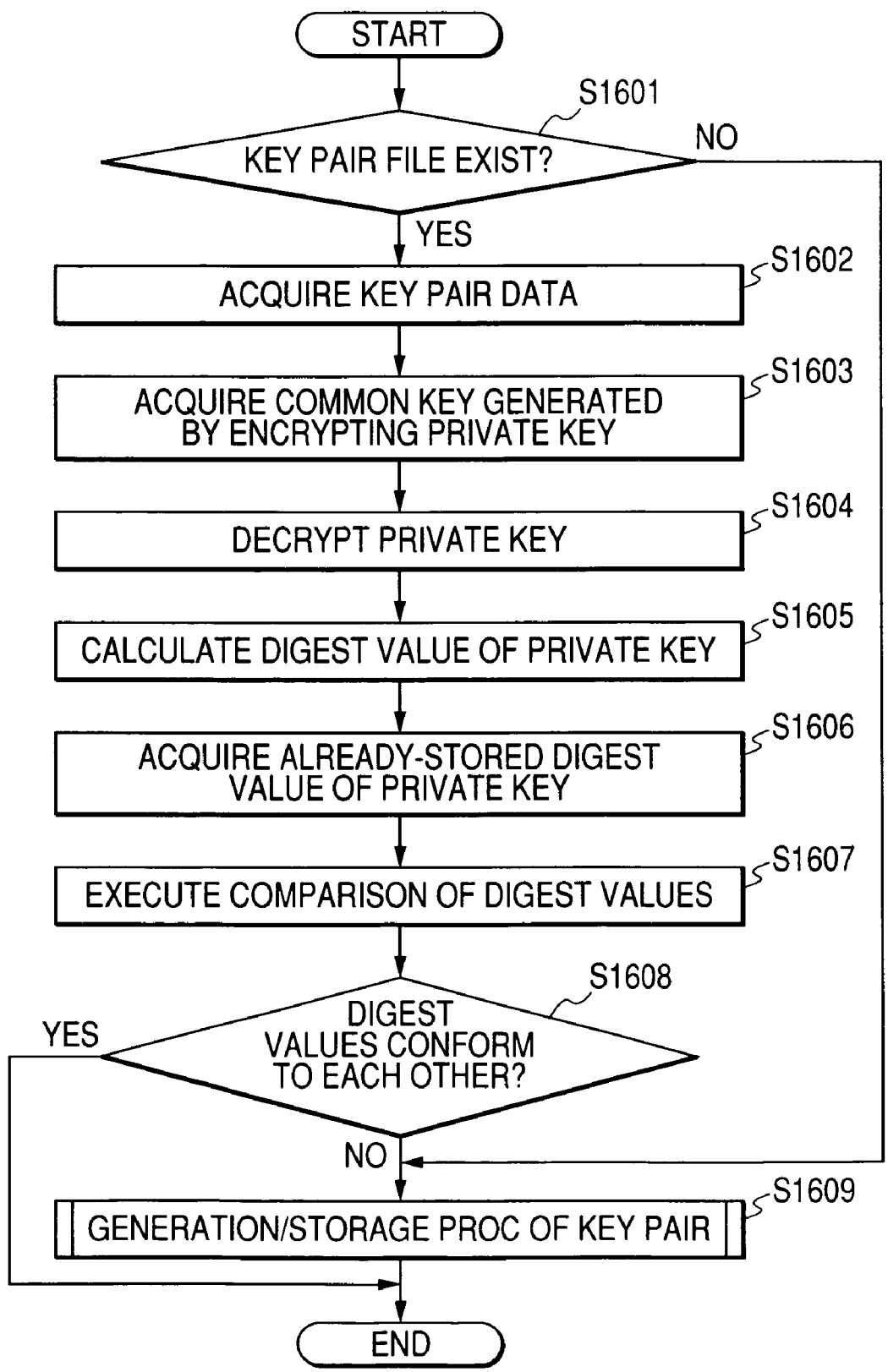
FIG. 16 is a flow chart for explaining one example of the operation to be executed by the print device in case of automatically generating and storing key pair data.
Figure 17:
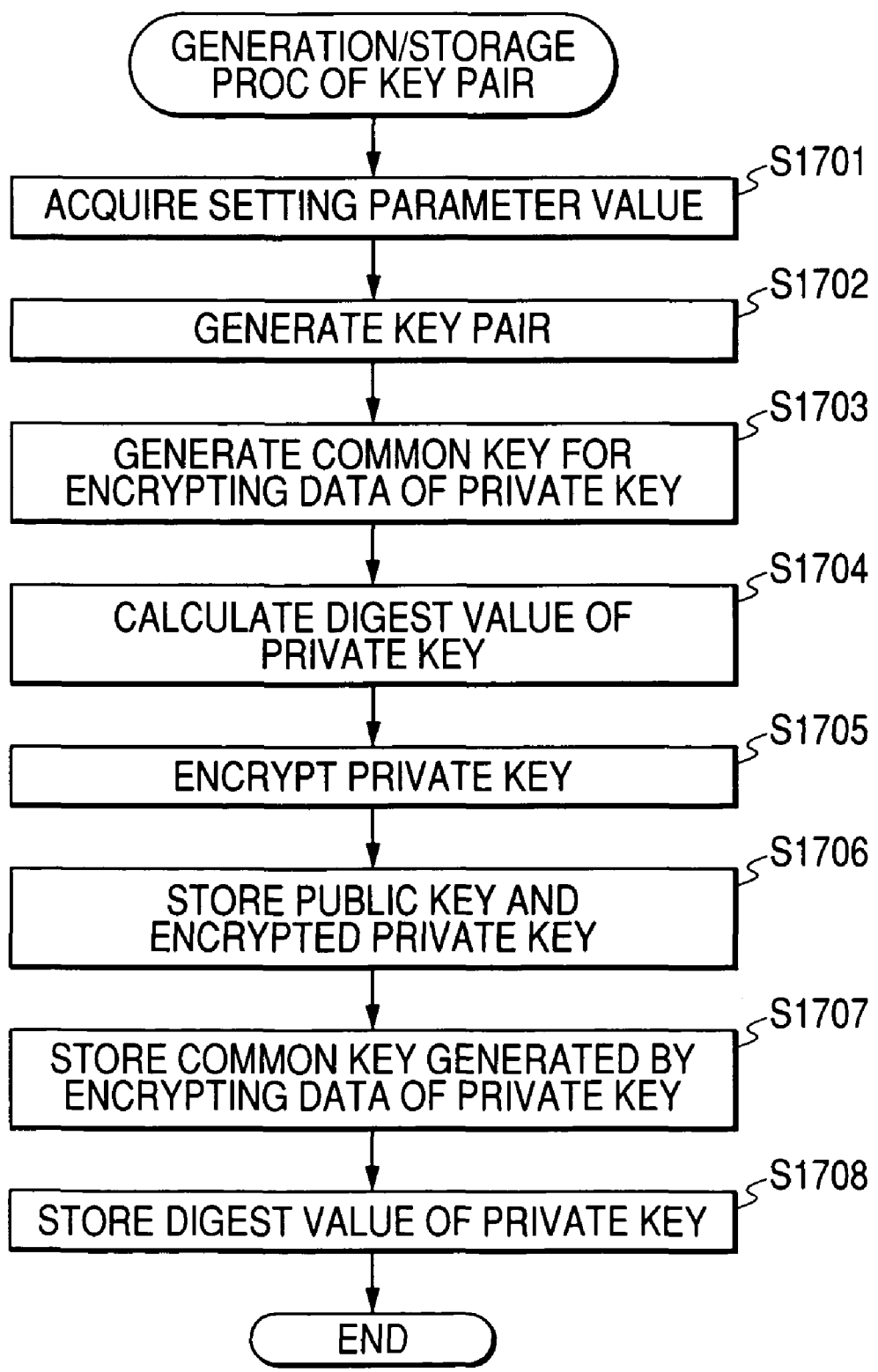
FIG. 17 is a flow chart for explaining one example of the operation to be executed by the print device in case of executing a key pair generation/storage process.

Incidentally, it should be noted that the key pair generation/storage process shown in FIG. 17 is the key pair generation/storage process in the step S1609 of FIG. 16.

Initially, in a step S1701, the key pair generation processing unit 1507 acquires a setting parameter value for generating the key pair. Here, the setting parameter value in the present embodiment includes the public key encryption algorithm of the key pair to be generated and the bit length of the data of the key.

In the present embodiment, the key pair of the public key encryption algorithm such as RSA (Rivest Shamir Adleman), DSA (Digital Signature Algorithm) or the like can be generated, as the public key encryption algorithm for the key pair to be generated. In the print device 1110, the public key encryption algorithm and the bit length of the data of the key are set beforehand as default setting values. These setting values are stored in the NVRAM 1305 of the print device 1110. Incidentally, it is possible for the user to change the public key encryption algorithm of the key pair to be generated and the bit length of the data of the key to be generated, through the operation on the UI 1311 being the touch-panel display screen shown in FIG. 13.

Next, in a step S1702, the key pair generation processing unit 1507 generates the key pair based on the setting values acquired in the step S1701 and stored in the NVRAM 1305. After the generation of the key pair normally ends, in a step S1703, the key pair generation processing unit 1507 generates pseudorandom numbers as the common key for encrypting by the common key encryption system the data of the private key of the key pair generated in the step S1702.

Then, in a step S1704, the key pair generation processing unit 1507 calculates and generates the digest value of the private key, generated in the step S1702, according to the algorithm of one-way hash function. As described above, it should be noted that the digest value of the private key is used in the step S1607 of FIG. 16 to detect whether or not the data of the private key is damaged.

After then, in a step S1705, the key pair generation processing unit 1507 encrypts the data of the private key by using the common key for encrypting the private key generated in the step S1703.

When the encryption of the data of the private key in the step S1705 succeeds, the flow advances to a step S1706. In the step S1706, the key pair storage processing unit 1508 outputs the data of the public key and the encrypted data of the private key as the file and stores them in the HD 1309.

Moreover, in a step S1707, the key pair storage processing unit 1508 stores in the NVRAM 1503 the data of the common key used in case of encrypting the data of the private key. Likewise, in a step S1708, the key pair storage processing unit 1508 stores in the NVRAM 1503 the data of the digest value of the private key. Then, the key pair generation/storage process based on the flow chart shown in FIG. 17 ends.

As described above, in the present embodiment, the print device 1110 automatically generates and stores the key pair. In addition, when the user wishes to regenerate and update the key pair, it is possible for the print device 1110 to regenerate and update the key pair.

Subsequently, one example of the operation to be executed by the print device 1110 in case of regenerating and updating the key pair based on the user setting will be explained hereinafter with reference to a flow chart shown in FIG. 18.

Incidentally, as well as the above case where the user designates the public key encryption algorithm of the key pair to be generated and the bit length of the data of the key, the print device 1110 in the present embodiment can designate the regeneration and update of the key pair.

That is, it is possible for the user to set the setting value of the regeneration and update of the key pair, through the operation on the UI 1311 being the touch-panel display screen shown in FIG. 13. Then, the acquired setting value is stored in the NVRAM 1305.

Initially, in a step S1801, when the power supply of the print device 1110 is turned on, the key pair generation processing unit 1507 acquires the setting value of the regeneration and update of the key pair. Then, in a step S1802, the key pair generation processing unit 1507 judges whether the setting is "ON" or "OFF" based on the setting value acquired in the step S1801. Then, when judged that the setting is "ON" based on the setting value acquired in the step S1801, the flow advances to a step S1811 to execute a regeneration/update process of the key pair.

Meanwhile, when judged in the step S1802 that the setting is "OFF", the flow advances to steps S1803 through S1810.

Here, it should be noted that the process in the step S1811 is the same as the process in the step S1609 shown in FIG. 16 (that is, the process in the steps S1701 to S1708 shown in FIG. 17). Moreover, it should be noted that the process in the steps S1803 to S1810 is the same as the process in the steps S1601 to S1608 shown in FIG. 16. Therefore, the detailed explanation of these processes will be omitted.

In the present embodiment, the case where the key pair is regenerated and updated when the print device 1110 is activated is explained by way of example. In addition, even when the print device 1110 is being operated, it is possible based on the user operation on the UI 1311 to judge whether the setting of the regeneration and update of the key pair is "ON" or "OFF", and, when judged that the setting is "ON", it is possible to regenerate and update the key pair in the above manner.

As described above, according to the present embodiment, when the power supply of the print device 1110 is turned on, it is judged whether or not the key pair data exists in the HD 1309 of the print device 1110. Then, when it is judged that the key pair data does not exist in the HD 1309, the key pair is generated and stored. Thus, even when the key pair stored in the print device 1110 is deleted for some reason, the key pair data can be acquired without any complicated operation by the user. Consequently, it is possible to easily and certainly prevent the inconvenient situation that the encryption communication of the data between the print device 1110 and the user terminal device 1130 becomes impossible.

Meanwhile, when it is judged that the key pair data exists in the HD 1309 of the print device 1110, the private key included in the key pair data is decrypted, and the digest value of the relevant private key is generated. In addition, the digest value of the private key calculated when the key pair data is generated is acquired. Then, when the generated digest value does not conform to the acquired digest value, it is judged that the data of the private key is damaged, and the key pair data is thus regenerated and updated. Therefore, even if the key pair stored in the print device 1110 is damaged for some reason, the adequate key pair data can be acquired without any complicated operation by the user. On this account, it is possible to easily and certainly prevent the inconvenient situation that the encryption communication of the data between the print device 1110 and the user terminal device 1130 becomes impossible.

Moreover, in addition to the case where the power supply of the print device 1110 is turned on, the key pair data is regenerated and updated based on the user operation on the UI 1311 of the print device 1110 in some cases. Thus, for example, in a case where the user judges that there is a fear that secrecy of the key pair is lost, it is possible to update the key pair data in accordance with the intention of the user. On this account, the secrecy of the data to be transmitted and received between the print device 1110 and the user terminal device 1130 can be certainly held or maintained as much as possible.

Figure 10:
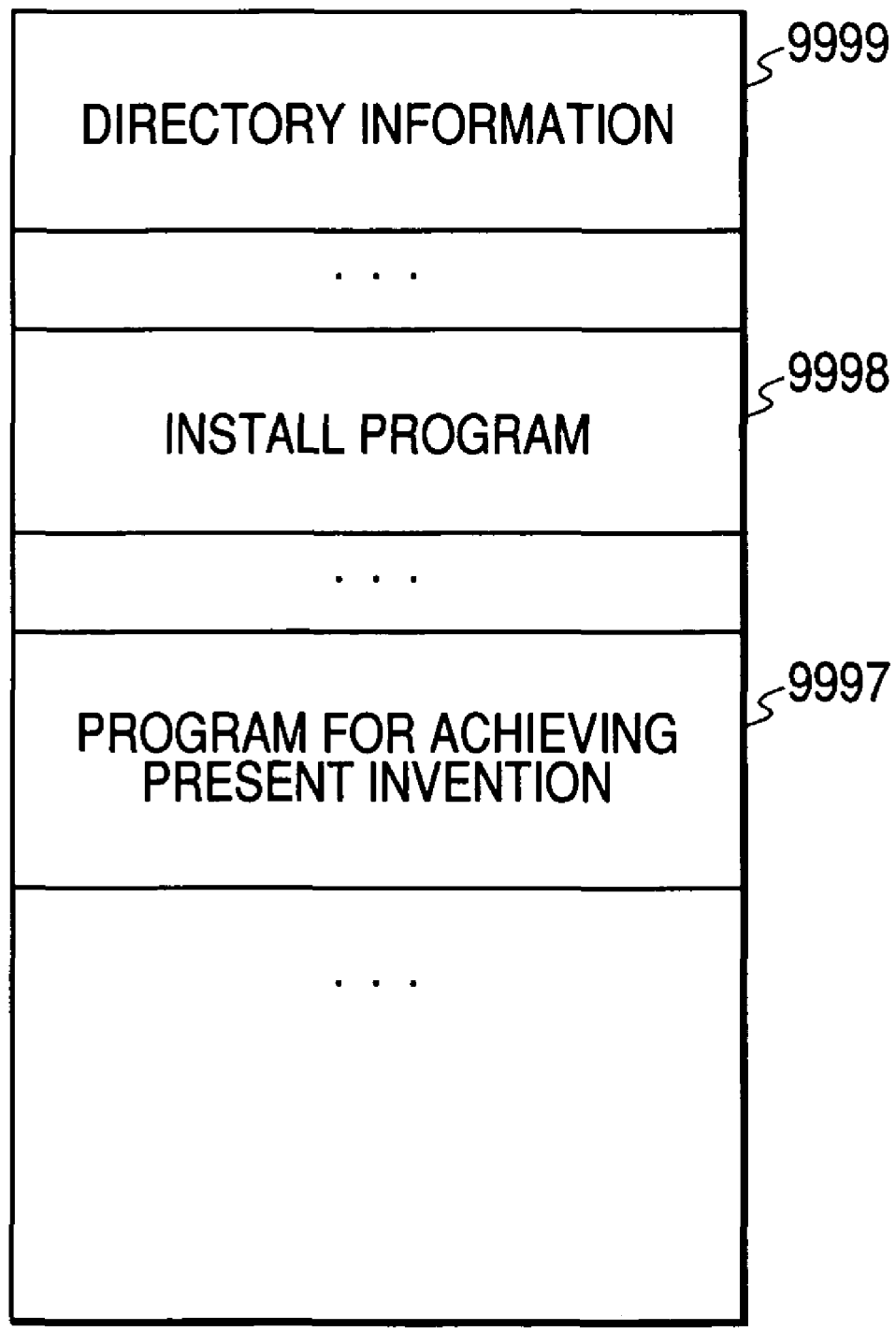
FIG. 10 is a diagram showing, in a storage medium, a memory map of the program for executing the procedure according to the present embodiment.

FIG. 10 is a diagram showing a memory map of a CD-ROM being one example of a storage medium. In FIG. 10, numeral 9999 denotes an area in which directory information is stored, numeral 9998 denotes an area in which a later install program is stored, and numeral 9997 denotes an area in which the program for achieving the embodiments of the present invention is stored. More specifically, the area 9998 is the area in which the program for installing the program to achieve the embodiments of the present invention is stored.

The area 9997 is the area in which the program for achieving the embodiments of the present invention is stored. That is, in a case where the program for achieving the embodiments of the present invention is installed in, e.g., the device 300, the install program stored in the area 9998 is first loaded to the system, and the loaded program is executed by the CPU 301.

Next, the install program executed by the CPU 301 allows to read the program for achieving the embodiments of the present invention from the area 9997 and then store the read program in the HD 311.

Incidentally, the present invention can be applied to a system or an integrated device which consists of plural devices such as a host computer, an interface equipment, a reader and the like, or to an apparatus which comprises a single device.

Further, it is needless to say that the object of the present invention can be achieved in a case where a storage medium storing therein the program codes of software to realize the functions of the above embodiments is supplied to a system or an apparatus, and thus a computer (or CPU or MPU) in the system or the apparatus reads and executes the program codes stored in the storage medium. In this case, the program codes themselves read out of the storage medium realize the novel functions of the present invention. Therefore, the storage medium which stores these program codes constitutes the present invention.

As the storage medium from which the program codes are supplied, for example, a floppy™ disk, a hard disk, an optical disk, a magnetooptical disk, a CD-ROM, a CD-R, a magnetic tape, a nonvolatile memory card, a ROM or the like can be used.

Further, the present invention includes not only a case where the functions of the above embodiments are realized by executing the program codes read by the computer, but also a case where an OS (operating system) or the like running on the computer executes a part or all of the actual process on the basis of the instructions of the program codes and thus the functions of the above embodiments are realized by the relevant process.

Furthermore, the present invention also includes a case where, after the program codes read out of the storage medium are written into a function expansion board inserted in the computer or the memory provided in a function expansion unit connected to the computer, the CPU or the like provided in the function expansion board or the function expansion unit executes a part or all of the actual process on the basis of the instructions of the program codes, and thus the functions of the above embodiments are realized by the relevant process.

In addition, it is needless to say that the present invention can be also applied to a case where the program codes of software to realize the functions of the above embodiments are delivered from the storage medium to the requesters through a communication line in personal computer communication or the like.

This application claims priorities from Japanese Patent Application Nos. 2004-117117 filed on Apr. 12, 2004, and 2004-191542 filed on Jun. 29, 2004, which are hereby incorporated by reference herein.

What is claimed is:

1. A data processing device comprising:
   a storage unit configured to store an initial value of a pair of a public key and a private key;
   a communication unit configured to (i) transmit the public key stored in said storage unit to an external device, (ii) receive a session key encrypted using the transmitted public key, (iii) decrypt the received session key using the private key stored in said storage unit, and (iv) receive a new pair of a public key and a private key from the external device using the decrypted session key;
   an installation unit configured to install the new pair of the public key and the private key received by said communication unit;
   a determination unit configured to determine whether login by an administrator authority is acknowledged;
   an installation permission unit configured to permit said installation unit to install the new pair of the public key and the private key when the login by an administrator authority is acknowledged; and
   a display control unit configured to cause a display unit to display a value of the public key installed from the external device.

2. A data processing device according to claim 1, further comprising a display control unit configured to cause a display unit to display the initial value of the pair of the public key and the private key stored in said storage unit.

3. A data processing device according to claim 1, further comprising a default unit configured to return the value of the pair of the public key and the private key stored in said storage unit to the initial value, in response to an instruction from a user.

4. A data processing device comprising:
   a storage unit configured to store an initial value of a pair of a public key and a private key;
   a communication unit configured to (i) transmit the public key stored in said storage unit to an external device, (ii) receive a session key encrypted using the transmitted public key, (iii) decrypt the received session key using the private key stored in said storage unit, and (iv) receive a new pair of a public key and a private key from the external device using the decrypted session key;
   an installation unit configured to install the new pair of the public key and the private key received by said communication unit;
   a display control unit configured to cause a display unit to display a value of the public key generated by said key generation unit; and
   a key generation unit configured to generate the initial value of the pair of the public key and the private key in said data processing device, in response to an instruction from a user,
   wherein said installation unit installs the new pair of the public key and the private key obtained from the external device by executing the encryption communication by using the initial value of the pair of the public key and the private key generated by said key generation unit.

5. A control method for controlling a data processing device, comprising:
   storing an initial value of a pair of a public key and a private key in a storage unit;
   transmitting, using a communication unit, the public key stored in the storage unit to an external device;
   receiving, using the communication unit, a session key encrypted using the transmitted public key;
   decrypting the received session key using the private key stored in the storage unit;
   receiving a new pair of a public key and a private key from the external device using the decrypted session key;
   determining, using a determination unit, whether login by an administrator authority is acknowledged;
   permitting installation of the new pair of the public key and the private key when the login by an administrator authority is acknowledged;
   installing, using an installation unit, the received new pair of the public key and the private key when installation is permitted; and
   displaying, using a display control unit, a value of the public key installed from the external device.

* * * * *